United States Patent
Gani et al.

(10) Patent No.: US 12,417,620 B2
(45) Date of Patent: Sep. 16, 2025

(54) SYSTEM AND METHOD OF TRAINING VISION TRANSFORMER ON SMALL-SCALE DATASETS

(71) Applicant: Mohamed bin Zayed University of Artificial Intelligence, Abu Dhabi (AE)

(72) Inventors: Mohammad Hanan Gani, Abu Dhabi (AE); Muhammad Muzammal Naseer, Abu Dhabi (AE); Mohammad Yaqub, Abu Dhabi (AE)

(73) Assignee: Mohamed bin Zayed University of Artificial Intelligence, Abu Dhabi (AE)

( * ) Notice: Subject to any disclaimer, the term of this patent is extended or adjusted under 35 U.S.C. 154(b) by 335 days.

(21) Appl. No.: 18/089,107

(22) Filed: Dec. 27, 2022

(65) Prior Publication Data
US 2024/0212330 A1     Jun. 27, 2024

(51) Int. Cl.
*G06V 10/774* (2022.01)
*G06V 10/94* (2022.01)
(Continued)

(52) U.S. Cl.
CPC .......... *G06V 10/7753* (2022.01); *G06V 10/95* (2022.01); *G06V 20/695* (2022.01);
(Continued)

(58) Field of Classification Search
CPC .. G06V 10/7753; G06V 10/95; G06V 20/695; G06V 20/698; G06V 20/70; G06V 2201/03; G06V 10/82
See application file for complete search history.

(56) References Cited

U.S. PATENT DOCUMENTS

| | | | |
|---|---|---|---|
| 2021/0357762 A1 | 11/2021 | Clement et al. | |
| 2023/0103997 A1* | 4/2023 | Li | G06V 10/761 |
| | | | 382/156 |

FOREIGN PATENT DOCUMENTS

| | | | | |
|---|---|---|---|---|
| CN | 113705532 A | * | 11/2021 | G06N 3/045 |
| CN | 115019123 A | * | 9/2022 | |
| WO | WO-2021099584 A1 | * | 5/2021 | G06F 18/214 |

OTHER PUBLICATIONS

Yun-Hao Cao, et al., "Training Vision Transformers with Only 2040 Images", European Conference on Computer Vision (ECCV), Jan. 26, 2022, pp. 220-237.
(Continued)

*Primary Examiner* — John Villecco
*Assistant Examiner* — Kyla Guan-Ping Tiao Allen
(74) *Attorney, Agent, or Firm* — Oblon, McClelland, Maier &Neustadt, L.L.P.

(57) ABSTRACT

A deep learning training system and method, includes an imaging system for capturing medical images, a machine learning engine, and display. The machine learning engine selects a small-scale of images from a training dataset, generates global views by randomly selecting regions in one image, generates local views by randomly selecting regions covering less than a majority of the image, receives the generated global views as a first sequence of non-overlapping image patches, receives the generated global views and the generated local views as a second sequence of non-overlapping image patches, trains parameters in a student-teacher network to predict a class of objects by self-supervised view prediction using the first sequence and the second sequence. The teacher parameters are updated via exponential moving average of the student network parameters. The
(Continued)

parameters in the teacher network are transferred to the vision transformer, and the vision transformer is trained by supervised learning.

20 Claims, 28 Drawing Sheets

(51) Int. Cl.
*G06V 20/69* (2022.01)
*G06V 20/70* (2022.01)

(52) U.S. Cl.
CPC ............ *G06V 20/698* (2022.01); *G06V 20/70* (2022.01); *G06V 2201/03* (2022.01)

(56) References Cited

OTHER PUBLICATIONS

Hanoona Rasheed, et al., "Bridging the Gap between Object and Image-level Representations for Open-Vocabulary Detection", Computer Vision and Pattern Recognition [cs.CV]; Artificial Intelligence (cs.AI), arXiv:2207.03482v1 [cs.CV], Jul. 7, 2022, pp. 1-17.

* cited by examiner

SYSTEM AND METHOD OF TRAINING VISION TRANSFORMER ON SMALL-SCALE DATASETS

STATEMENT REGARDING PRIOR DISCLOSURE BY THE INVENTORS

Aspects of this technology are described in Gani, Hanan, Muzammal Naseer, and Mohammad Yaqub. "How to Train Vision Transformer on Small-scale Datasets?" *arXiv preprint arXiv:* 2210.07240 (2022), and is incorporated herein by reference in its entirety. The code along with pre-trained models are publicly available at: github.com/hananshafi/vits-for-small-scale-datasets.

BACKGROUND

Technical Field

The present disclosure is directed to a training method and system for a vision transformer using a small-scale dataset, and in particular learning initial weights using self-supervised training followed by finetuning by supervised learning on the same or a similar dataset. Provided a teacher-student framework, a teacher network processes global views of images to generate target features while local and global views of the images are passed through the student network to generate predicted features. Weights of the teacher network are transferred to a vision transformer where the transformer is trained using supervised learning. Using the training method, given only 1% of all labeled images, the vision transformer can achieve performance as if trained with all images.

Description of Related Art

Medical image segmentation is a step in medical diagnosis that provides identification of objects in an image. One type of medical image is an image from a microscope. An image from a microscope can include individual cells. In the case of microscopic images of individual cells, light microscopy combined with well-established protocols of two-dimensional cell culture facilitates high-throughput quantitative imaging to study biological phenomena. A cell culture can reveal cellular movement and changes in cell state and can be captured over multiple images. Accurate segmentation of individual cells in multiple images enables exploration of complex biological questions, but can require sophisticated imaging processing pipelines due to low contrast and high object density.

Deep learning-based methods are considered state-of-the-art for image segmentation but typically require vast amounts of annotated data, for which there is no suitable resource available, especially in the field of cellular imaging. Since their inception, Vision Transformers (ViTs) have emerged as an effective alternative to traditional Convolutional Nerual Networks (CNNs). See Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. *arXiv preprint arXiv:* 2010.11929, 2020; Salman Khan, Muzammal Naseer, Munawar Hayat, Syed-Waqas Zamir, Fahad Shahbaz Khan, and Mubarak Shah. Transformers in vision: A survey. *ACM Computing Surveys (CSUR)*, 2021; Kaiming He, Xiangyu Zhang, Shaoqing Ren, and Jian Sun. Deep residual learning for image recognition. In *Proceedings of the IEEE conference on computer vision and pattern recognition*, pages 770-778, 2016; Gao Huang, Zhuang Liu, Laurens Van Der Maaten, and Kilian Q Weinberger. Densely connected convolutional networks. In *Proceedings of the IEEE conference on computer vision and pattern recognition*, pages 4700-4708, 2017; Alex Krizhevsky, Ilya Sutskever, and Geoffrey E Hinton. Imagenet classification with deep convolutional neural networks. In F. Pereira, C. J. Burges, L. Bottou, and K. Q. Weinberger, editors, *Advances in Neural Information Processing Systems*, volume 25. Curran Associates, Inc., 2012; Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In *Proceedings of the IEEE conference on computer vision and pattern recognition*, pages 1-9, 2015; Mingxing Tan and Quoc Le. Efficientnet: Rethinking model scaling for convolutional neural networks. In *International conference on machine learning*, pages 6105-6114. PMLR, 2019; and Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. *IEEE transactions on pattern analysis and machine intelligence*, 43(10):3349-3364, 2020, each incorporated herein by reference in their entirety.

The architecture of Vision Transformer is inspired by the prominent Transformer encoder used in natural language processing (NLP) tasks, which processes data in the form of a sequence of vectors or tokens. See Jacob Devlin, Ming-Wei Chang, Kenton Lee, and Kristina Toutanova. Bert: Pretraining of deep bidirectional transformers for language understanding. *arXiv preprint arXiv:* 1810.04805, 2018; and Ashish Vaswani, Noam Shazeer, Niki Parmar, Jakob Uszkoreit, Llion Jones, Aidan N Gomez, Łukasz Kaiser, and Illia Polosukhin. Attention is all you need. *Advances in neural information processing systems,* 30, 2017, each incorporated herein by reference in their entirety. Similar to the word tokens in NLP Transformer, ViT typically splits the image into a grid of non-overlapping patches before passing them to a linear projection layer to adjust the token dimensionality. These tokens are then processed by a series of feed-forward and multi-headed self-attention layers. Due to their ability to capture global structure through self-attention, ViTs have found extensive application in many tasks such as classification object detection, segmentation, restoration, and 3D vision. See Muhammad Muzammal Naseer, Kanchana Ranasinghe, Salman H Khan, Munawar Hayat, Fahad Shahbaz Khan, and Ming-Hsuan Yang. Intriguing properties of vision transformers. *Advances in Neural Information Processing Systems,* 34:23296-23308, 2021; Dosovitskiy et al.; Yawei Li, K. Zhang, Jie Cao, Radu Timofte, and Luc Van Gool. Localvit: Bringing locality to vision transformers. ArXiv, abs/2104.05707, 2021; Ze Liu, Yutong Lin, Yue Cao, Han Hu, Yixuan Wei, Zheng Zhang, Stephen Lin, and Baining Guo. Swin transformer: Hierarchical vision transformer using shifted windows. In *Proceedings of the IEEE CVF International Conference on Computer Vision,* pages 10012-10022, 2021; Hugo Touvron, Matthieu Cord, Matthijs Douze, Francisco Massa, Alexandre Sablayrolles, and Hervé Jégou. Training data-efficient image transformers & distillation through attention. In *International Conference on Machine Learning,* pages 10347-10357. PMLR, 2021; Hugo Touvron, Matthieu Cord, Alexandre Sablayrolles, Gabriel Synnaeve, and Hervé Jégou. Going deeper with image transformers. In *Proceedings of the IEEE CVF International Conference on Computer Vision,* pages 32-42, 2021; Haiping Wu, Bin Xiao, Noel Codella, Mengchen Liu, Xiyang Dai, Lu Yuan, and Lei Zhang. Cvt: Introducing convolutions to vision transformers. In *Proceedings of the IEEE CVF International Conference on Computer Vision*, pages 22-31, 2021; Weijian Xu, Yifan Xu, Tyler Chang, and Zhuowen Tu. Co-scale conv-attentional image transformers. In *Proceedings of the IEEE CVF International Conference on Computer Vision*, pages 9981-9990, 2021; Kun Yuan, Shaopeng Guo, Ziwei Liu, Aojun Zhou, Fengwei Yu, and Wei Wu. Incorporating convolution designs into visual transformers. 2021 *IEEE CVF International Conference on Computer Vision (ICCV)*, pages 559-568, 2021; Li Yuan, Yunpeng Chen, Tao Wang, Weihao Yu, Yujun Shi, Francis E. H. Tay, Jiashi Feng, and Shuicheng Yan. Tokens-to-token vit: Training vision transformers from scratch on imagenet. 2021 *IEEE CVF International Conference on Computer Vision (ICCV)*, pages 538-547, 2021; Nicolas Carion, Francisco Massa, Gabriel Synnaeve, Nicolas Usunier, Alexander Kirillov, and Sergey Zagoruyko. End-to-end object detection with transformers. In *European conference on computer vision*, pages 213-229. Springer, 2020; Zhigang Dai, Bolun Cai, Yugeng Lin, and Junying Chen. Up-detr: Unsupervised pretraining for object detection with transformers. In *Proceedings of the IEEE CVF Conference on Computer Vision and Pattern Recognition*, pages 1601-1610, 2021; Aishwarya Kamath, Mannat Singh, Yann LeCun, Gabriel Synnaeve, Ishan Misra, and Nicolas Carion. Mdetr-modulated detection for end-to-end multi-modal understanding. In *Proceedings of the IEEE CVF International Conference on Computer Vision*, pages 1780-1790, 2021; Xizhou Zhu, Weijie Su, Lewei Lu, Bin Li, Xiaogang Wang, and Jifeng Dai. Deformable detr: Deformable transformers for end-to-end object detection. arXiv preprint *arXiv: 2010.04159*, 2020; René Ranftl, Alexey Bochkovskiy, and Vladlen Koltun. Vision transformers for dense prediction. In *Proceedings of the IEEE CVF International Conference on Computer Vision*, pages 12179-12188, 2021; Robin Strudel, Ricardo Garcia, Ivan Laptev, and Cordelia Schmid. Segmenter: Transformer for semantic segmentation. In *Proceedings of the IEEE CVF International Conference on Computer Vision*, pages 7262-7272, 2021; Jingyun Liang, Jiezhang Cao, Guolei Sun, Kai Zhang, Luc Van Gool, and Radu Timofte. Swinir: Image restoration using swin transformer. In *Proceedings of the IEEE CVF International Conference on Computer Vision*, pages 1833-1844, 2021; Shuo Chen, Tan Yu, and Ping Li. Mvt: Multi-view vision transformer for 3d object recognition. *arXiv preprint arXiv: 2110.13083*, 2021; and H. Zhao, L. Jiang, J. Jia, P. Torr, and V. Koltun. Point transformer. In 2021 *IEEE CVF International Conference on Computer Vision (ICCV)*, pages 16239-16248, Los Alamitos, CA, USA, oct 2021. IEEE Computer Society. doi: 10.1109/ICCV48922. 2021.01595, each incorporated herein by reference in their entirety.

Despite their advantages, vision transformers fail to match the performance of CNNs when trained from scratch on small-scale datasets. This is primarily due to the lack of locality, inductive biases and hierarchical structure of the representations which are commonly observed in CNN architectures. See Ze Liu et al.; Wu et al.; and Kun Yuan et al. As a result, vision transformers require large-scale pre-training to learn such properties from the data for better transfer learning to downstream tasks. See Dosovitskiy et al. Typically, ViTs are trained with a private JFT-300M dataset with 303 million weakly supervised images or publicly available ImageNet-1k/22k datasets. See Chen Sun, Abhinav Shrivastava, Saurabh Singh, and Abhinav Gupta. Revisiting unreasonable effectiveness of data in deep learning era. In *Proceedings of the IEEE international conference on computer vision*, pages 843-852, 2017; and Jia Deng, Wei Dong, Richard Socher, Li-Jia Li, Kai Li, and Li Fei-Fei. Imagenet: A large-scale hierarchical image database. In 2009 *IEEE Conference on Computer Vision and Pattern Recognition*, pages 248-255, 2009. doi: 10.1109/CVPR.2009.5206848, each incorporated herein by reference in their entirety. However, the absence of such large-scale pre-training hampers the performance of vision transformers on small-scale datasets. See Seung Hoon Lee, Seunghyun Lee, and Byung Cheol Song. Vision transformer for small-size datasets. *arXiv preprint arXiv:* 2112.13492, 2021; and Yahui Liu, Enver Sangineto, Wei Bi, Nicu Sebe, Bruno Lepri, and Marco Nadai. Efficient training of visual transformers with small datasets. *Advances in Neural Information Processing Systems*, 34, 2021, each incorporated herein by reference in their entirety.

To ease the optimization difficulties during vision transformer training, different architectural designs have been proposed to induce the necessary inductive biases for the Vision Transformer. See Benjamin Graham, Alaaeldin El-Nouby, Hugo Touvron, Pierre Stock, Armand Joulin, Herv'e J'egou, and Matthijs Douze. Levit: a vision transformer in convnet's clothing for faster inference. 2021 *IEEE CVF International Conference on Computer Vision (ICCV)*, pages 12239-12249, 2021; Li et al; Liu et al; Wu et al.; and Kun Yuan et al. These hybrid networks still remain sub-optimal for small datasets and either require further modifications to the loss functions or network architecture. See Liu et al. and Seung et al. Even with careful design choices, these methods remain sensitive to the type of data distribution e.g., Liu's performance degrades on Tiny-ImageNet, a complex data distribution as compared to other small datasets such CIFAR.

Various approaches have been proposed for vision transformers for small datasets, self-supervised learning and weight initialization. There have been attempts to train vision transformers on ImageNet from scratch. See Graham et al.; Ze Liu et al.; Touvron et al. (*International Conference on Machine Learning*); Touvron (*Proceedings of the IEEE CVF International Conference on Computer Vision*); Wu et al.; and Yuan et al. Touvron (*International Conference on Machine Learning*) improves the performance of ViT through data augmentations, regularization, and knowledge distillation. Li Yuan et al. introduces a new image tokenization strategy by recursively aggregating the neighboring tokens in order to model the locality into the network. Ze Liu et al. introduces a hierarchical vision transformer which processes the input at various scales and limits the self-attention to non-overlapping patches by the use of shifted windows. Wu et al. replaces the projection and multilayer perceptron layers with convolution layers in order to introduce the shift, scale, and distortion invariance. Recently, there have been some attempts to train vision transformers on small datasets.

Vision Transformers for Small Datasets: Lee et al. applies a series of augmentations on the input data and introduces shifted patch tokenization (SPT) and locality self-attention (LSA), which enable ViT to learn from scratch even on small datasets. See Ekin D Cubuk, Barret Zoph, Jonathon Shlens, and Quoc V Le. Randaugment: Practical automated data augmentation with a reduced search space. In *Proceedings of the IEEE CVF Conference on Computer Vision and Pattern Recognition Workshops*, pages 702-703, 2020; Dan Hendrycks, Norman Mu, Ekin D Cubuk, Barret Zoph, Justin Gilmer, and Balaji Lakshminarayanan. Augmix: A simple data processing method to improve robustness and uncertainty. *arXiv preprint arXiv:* 1912.02781, 2019; Christian Szegedy, Vincent Vanhoucke, Sergey Ioffe, Jon Shlens, and Zbigniew Wojna. Rethinking the inception architecture for computer vision. In *Proceedings of the IEEE conference on computer vision and pattern recognition*, pages 2818-2826, 2016; Sangdoo Yun, Dongyoon Han, Seong Joon Oh, Sanghyuk Chun, Junsuk Choe, and Youngjoon Yoo. Cutmix: Regularization strategy to train strong classifiers with localizable features. In *Proceedings of the IEEE CVF international conference on computer vision*, pages 6023-6032, 2019; and Zhun Zhong, Liang Zheng, Guoliang Kang, Shaozi Li, and Yi Yang. Random erasing data augmentation. In *Proceedings of the AAAI conference on artificial intelligence*, volume 34, pages 13001-13008, 2020, each incorporated herein by reference in their entirety. Liu et al. trains a ViT with an additional proxy task of learning the spatial location of the encoded image tokens in order to learn the phenomena of locality.

Self-supervised learning: In recent years, several self-supervised techniques have been proposed to pre-train vision transformers. See Sara Atito, Muhammad Awais, and Josef Kittler. Sit: Self-supervised vision transformer. *arXiv preprint arXiv:* 2104.03602, 2021; Caron et al.; Kaiming He, Xinlei Chen, Saining Xie, Yanghao Li, Piotr Dollár, and Ross Girshick. Masked autoencoders are scalable vision learners. *arXiv preprint arXiv:* 2111.06377, 2021; Chunyuan Li, Jianwei Yang, Pengchuan Zhang, Mei Gao, Bin Xiao, Xiyang Dai, Lu Yuan, and Jianfeng Gao. Efficient self-supervised vision transformers for representation learning. *arXiv preprint arXiv:* 2106.09785, 2021; Zhenda Xie, Zheng Zhang, Yue Cao, Yutong Lin, Jianmin Bao, Zhuliang Yao, Qi Dai, and Han Hu. Simmim: A simple framework for masked image modeling. *arXiv preprint arXiv:* 2111.09886, 2021; and Jinghao Zhou, Chen Wei, Huiyu Wang, Wei Shen, Cihang Xie, Alan Yuille, and Tao Kong. ibot: Image bert pre-training with online tokenizer, 2021, each incorporated herein by reference in their entirety. In Caron et al., the pretext task is to match the local and global features by minimizing the cross entropy loss. In Kaiming et al (2021), Xie et al., the input patches are masked and the network is tasked to predict the masked pixels. Zhou et al. retrains the network with two pretext tasks based on local-global feature matching and masked encoding. All these methods have shown impressive results on Imagenet linear evaluation and have been applied to numerous downstream tasks. Such pre-training strategies are computationally expensive and are designed for large sized datasets at higher resolution.

Weight Initialization. ImageNet pre-trained weights have been the default choice for network initialization in most computer vision tasks. However, given the amount of training time and computational resources required for such training, some past works have proposed methods to efficiently initialize the model weights. See Xiao Shi Huang, Felipe Perez, Jimmy Ba, and Maksims Volkovs. Improving transformer optimization through better initialization. In Hal Daumé III and Aarti Singh, editors, *Proceedings of the 37th International Conference on Machine Learning*, volume 119 of *Proceedings of Machine Learning Research*, pages 4475-4483. PMLR, 13-18 Jul. 2020; and Chen Zhu et al. Xiao Shi Huang et al. introduces a weight initialization scheme that eliminates the problem of learning rate warmup in NLP transformers, enabling deep transformer models to train without difficulty. Chen Zhu et al. presents a model agnostic initialization scheme which adjusts the norm of each network layer by introducing a multiplier variable in front of each parameter block. Apart from these approaches, a majority of the models are initialized using the basic weight initialization schemes, etc.

In conclusion, inherent inductive biases allow for training CNNs on small-scale datasets from scratch. A vision transformer on the other hand needs large-scale pre-training for successful transfer learning. See Dosovitskiy et al; and Touvron et al (*International Conference on Machine Learning*). An object is to eliminate the large-scale data requirement and train ViTs directly on a given small dataset.

It is an object of the present disclosure to provide a method and/or system to train a vision transformer using a small percentage of labeled images, for example on the order of one percent, but achieve performance that is substantially equivalent to performance as if trained with the entire large-scale training set. It is a further object to train a vision transformer on low resolution images that can achieve performance as if trained with high resolution images. It is a further object to train the vision transformer for image segmentation on low-resolution medical images, such as microscopic cell images.

SUMMARY

An aspect of the present disclosure is a deep learning training system, that can include an imaging system for capturing medical images; processing circuitry of a machine learning engine configured to select a subset of images from a training dataset of the captured medical images, generate global views by randomly selecting regions in one image of the subset of images covering a majority of the image, generate local views by randomly selecting regions covering less than a majority of the image of the one image, receive the generated global views as a first sequence of non-overlapping image patches, receive the generated global views and the generated local views as a second sequence of non-overlapping image patches, train parameters in a student-teacher network that includes a student network and a teacher network to predict a class of objects in the global views and the local views by self-supervised view prediction using the first sequence and the second sequence, wherein the processing circuitry updates the teacher parameters via exponential moving average of the student network parameters; initialize parameters in a vision transformer by transferring the trained parameters of the student-teacher network to the vision transformer; and perform supervised learning in the initialized vision transformer using the same subset of images; and an output device. to output a class label for the one image.

A further aspect is a non-transitory computer readable storage medium storing program instructions for a deep learning training framework, which when executed by processing circuitry of a machine learning engine, perform a method including selecting a subset of images from a training dataset of captured medical images; generating global views by randomly selecting regions in one image of the subset of images covering a majority of the image; generating local views by randomly selecting regions covering less than a majority of the image of the one image; receiving the generated global views as a first sequence of non-overlapping image patches; receiving the generated global views and the generated local views as a second sequence of non-overlapping image patches; training parameters in a student-teacher network that includes a student network and a teacher network to predict a class of objects in the global views and the local views by self-supervised view prediction using the first sequence and the second sequence, wherein the teacher parameters are updated via exponential moving average of the student network parameters; initialize parameters in a vision transformer by transferring the trained parameters of the student-teacher network to the vision transformer; and perform supervised learning in the initialized vision transformer using the same subset of images; and an output device. to output a class label for the one image.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
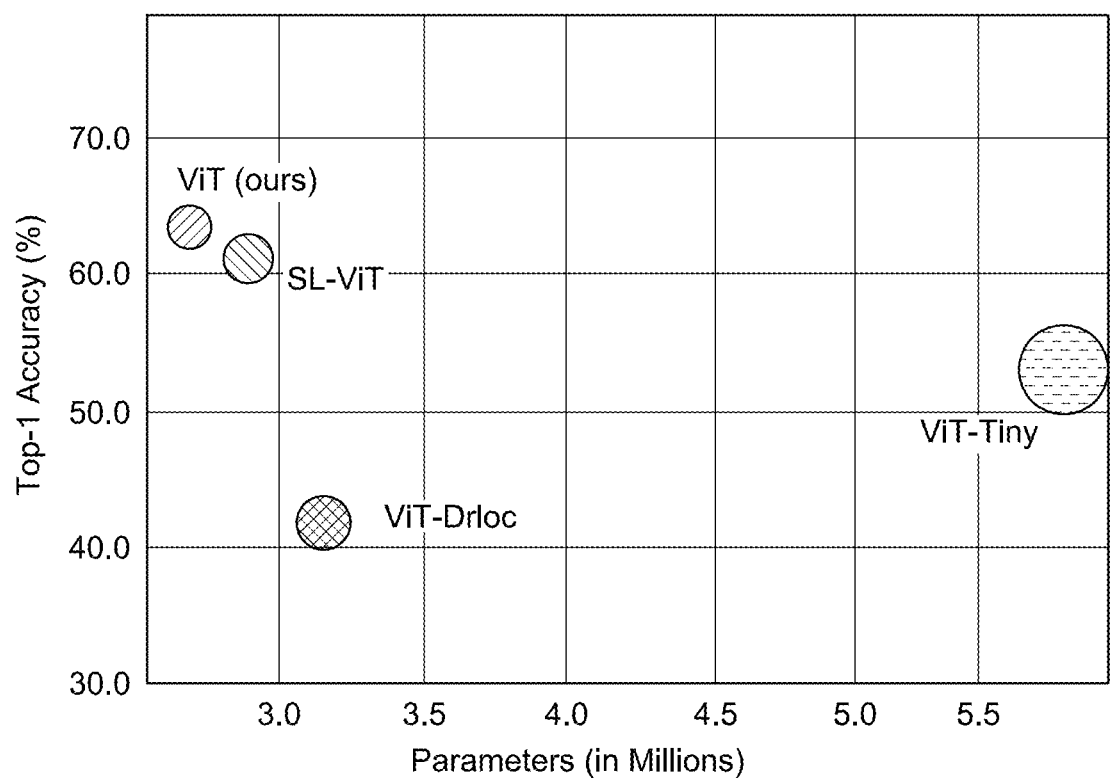
FIG. 1 is a graph of trainable parameters and generalization for vision transformers.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

To alleviate problems associated with training vision transformers on small-scale datasets, an effective two-stage framework, embodied for example as a method and/or system, is provided to train vision transformers (also referred to as ViTs) on small-scale low-resolution datasets from scratch. The two-stage framework includes a low-resolution view prediction as a weight initialization scheme. The two-stage framework provides a solution to the problem of sensitivity of ViTs to weight initialization where ViTs converge to vastly different solutions depending on the network initialization. Conventional approaches perform pre-training (a type of initialization) with large-scale data to capture inductive biases from the data and follow up with successful transfer learning on small datasets. In the absence of huge datasets, however, the present approach has considered that it may be possible for ViTs to benefit from the inductive biases directly learned on the target small dataset such as CIFAR10 or CIFAR100. To this end, the present self-supervised weight learning scheme provides a solution that improves a feature prediction of low-resolution global and local views via self-distillation. See Mathilde Caron, Hugo Touvron, Ishan Misra, Hervé Jégou, Julien Mairal, Piotr Bojanowski, and Armand Joulin. Emerging properties in self-supervised vision transformers. In *Proceedings of the IEEE CVF International Conference on Computer Vision*, pages 9650-9660, 2021, incorporated herein by reference in its entirety. The present approach includes a self-supervised to supervised learning stage for small-scale datasets. In the second stage, the same ViT network is finetuned on the same target dataset using cross-entropy loss.

For purposes of this disclosure, small-scale datasets refer to a small percentage or low resolution. Small-scale can include a small percentage of labeled training images, for example on the order of one percent, but can achieve performance that is substantially equivalent to performance as if training is made with the entire training set. Small-scale can include low-resolution images that can achieve performance as if trained with high-resolution images.

Also, scale size can depend on the type of problem. A full rose flower training dataset may include 150 images of roses. In such case, approximately 15 images are a small-scale dataset. The full MovieLens dataset is 20,000,263 samples. In this case, approximately 200,000 samples are a small-scale dataset. ImageNet is a dataset of over 14 million images. The small-scale dataset know as Tiny ImageNet contains 100000 images of 200 classes (500 for each class) downsized to 64×64 colored image.

The present method solves an important problem in the realm of Vision Transformers (ViT's) which struggle when trained on fewer number of samples. ViT's are data hungry architectures which lack inductive biases and hence require a huge amount of data for successful training and achieving decent performance. In the case of the medical domain where the amount of training data is often small, it is a challenging task to efficiently train models on such limited data. However, the present method can effectively leverage the information from small number of training samples and hence provide a better generalization performance on the test samples. Therefore, the present method can provide an effective solution to the problem of data scarcity in medical domain.

Most of the existing approaches in Vision Transformers (ViTs) and in computer vision in general work on high-resolution inputs as much as 224×224 or 384×384 and in some cases up-to 512×512 pixels as well. However, when the data has low resolution, the input information in the form of features contained in each sample is not enough for the model to train effectively. Therefore, in such cases, the models struggle to train properly and hence result in reduced performance. The present method scales well on the low-resolution inputs and successfully trains ViT's on these low dimensional inputs while being computationally efficient. The ability to train well on low-resolution inputs can aid in the medical imaging domain where the input samples sometimes have low quality which makes such inputs difficult for the model to identify.

Further, the present training method helps the Vision Transformer (ViT) learn the shapes of the objects in the image. Such a property can aid in segmenting the class-specific objects from unseen test samples without any supervision. Such segmentation abilities on tiny images have a strong potential in the domain of medical image segmentation. For instance, in the case of single cell segmentation, the object of interest (cell) is tiny. Using conventional approaches, segmenting such a small object becomes extremely hard for the model. However, the present method, which effectively learns the semantic shapes of the objects in the small low-resolution inputs can be effectively applied in such cases where the object of interest has small size.

FIG. 1 is a graph of trainable parameters and generalization that illustrates the improvement provided by the present approach over conventional vision transformers. The present approach is simple in nature and yet outperforms by notable margins both in terms of trainable parameters and generalization (top-1 accuracy) on Tiny-ImageNet. See Lee et al.; Yahui Liu et al; Touvron et al. (*International Conference on Machine Learning* (2021)); and Le et al. This shows that inductive biases learned by the present self-supervised approach serves as an effective weight initialization to substantially improve ViT optimization during supervised training. The present approach has been demonstrated to be beneficial to different ViT designs over multiple small-scale datasets.

Subsequentially, the present approach is agnostic to ViT architectures, independent to changes in loss functions, and provides significant gains in comparison to different weight initialization schemes and existing works. See Xavier Glorot and Yoshua Bengio. Understanding the difficulty of training deep feed-forward neural networks. In Yee Whye Teh and Mike Titterington, editors, *Proceedings of the Thirteenth International Conference on Artificial Intelligence and Statistics*, volume 9 of *Proceedings of Machine Learning Research*, pages 249-256, Chia Laguna Resort, Sardinia, Italy, 13-15 May 2010. PMLR; Kaiming He, Xiangyu Zhang, Shaoqing Ren, and Jian Sun. Delving deep into rectifiers: Surpassing human-level performance on imagenet classification. In *Proceedings of the IEEE international conference on computer vision*, pages 1026-1034, 2015; Adam Paszke, Sam Gross, Francisco Massa, Adam Lerer, James Bradbury, Gregory Chanan, Trevor Killeen, Zeming Lin, Natalia Gimelshein, Luca Antiga, et al. Pytorch: An imperative style, high-performance deep learning library. *Advances in neural information processing systems*, 32, 2019; Chen Zhu, Renkun Ni, Zheng Xu, Kezhi Kong, W. Ronny Huang, and Tom Goldstein. Gradinit: Learning to initialize neural networks for stable and efficient training.

The present training method has been demonstrated on five small datasets across different monolithic and non-monolith Vision Transformers. The present training method provides a self-supervised weight learning scheme from low-resolution views created on small datasets. This self-supervised weight learning scheme has been shown to be an effective weight initialization to successfully train ViTs from scratch, thus eliminating the need for large-scale pre-training. The present approach achieves the self-supervised inductive biases to improve the performance of ViTs on small datasets without modifying the network architecture or loss functions. The present training approach scales well with the input resolution. For instance, when trained on high-resolution samples, the present training method improves by 8% (CIFAR10) and 7% (CIFAR100) with respect to the state-of-the-art (SOTA) baseline for training ViTs on small datasets. Furthermore, the efficiency of the present approach is validated by observing its robustness against natural corruptions, and attention to salient regions in the input sample.

Different from conventional vision transformer approaches for small datasets, the present vision transformer architecture is provided without any modification to the internal layers or addition of new loss function. The present approach learns better generalizable features from the existing small target datasets.

Different from conventional vision transformers trained with self-supervised learning, the present vision transformer applies self-supervision for low-resolution small dataset to observe substantial improvements.

Different from vision transformer weight initialization approaches, the initial weights of the present vision transformer are learned using self-supervised learning directly from small datasets without any changes in the architecture or the optimizer.

Figure 2:
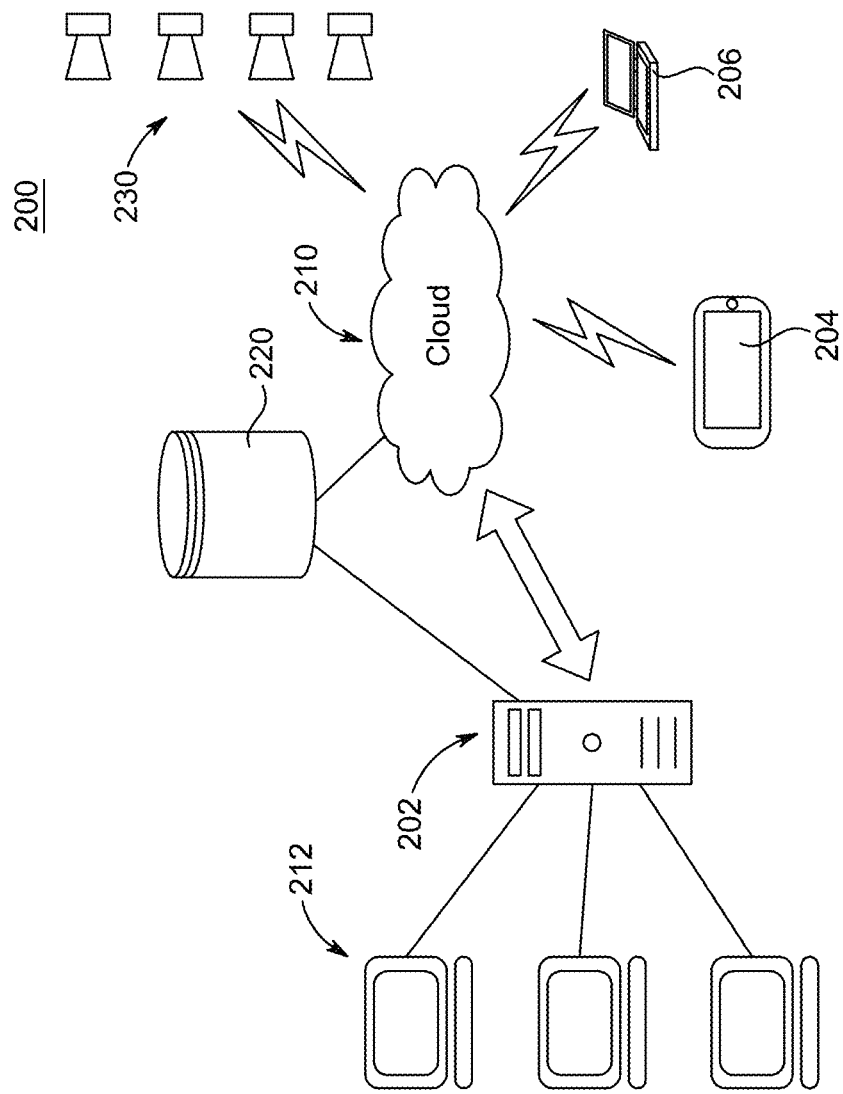
FIG. 2 is a system for training and evaluating machine learning models.
Figure 3A:
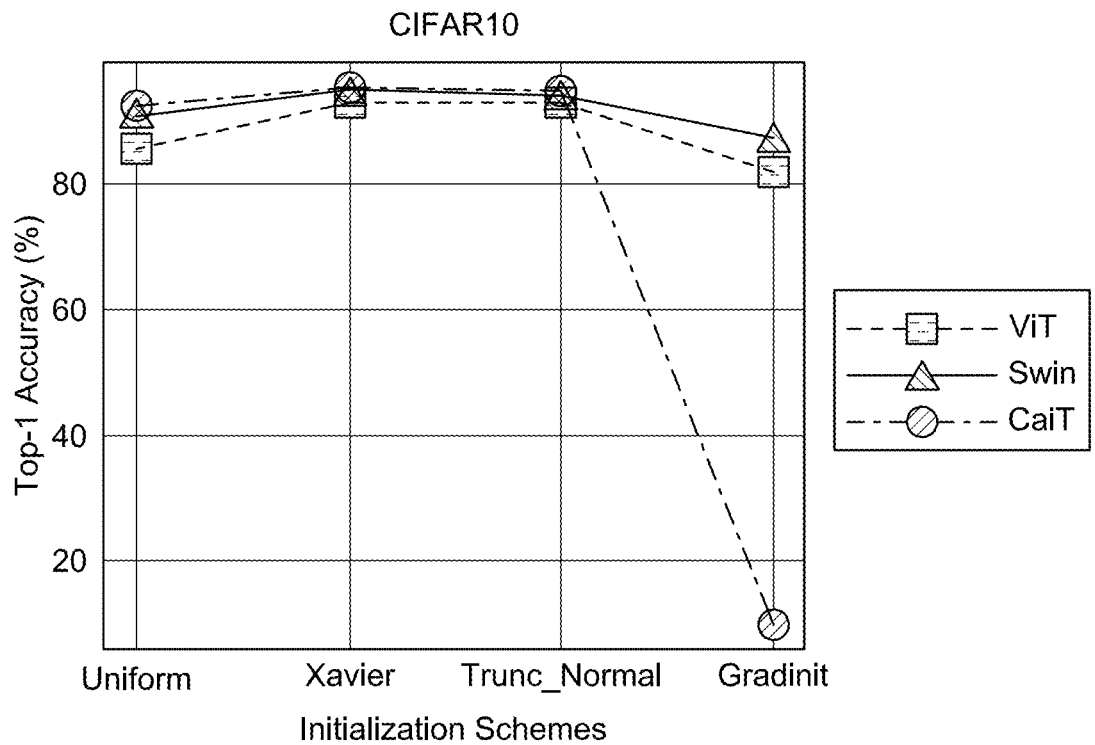
FIGS. 3A, 3B, 3C, 3D are graphs of vision transformers trained with different weight initialization schemes.
Figure 3B:
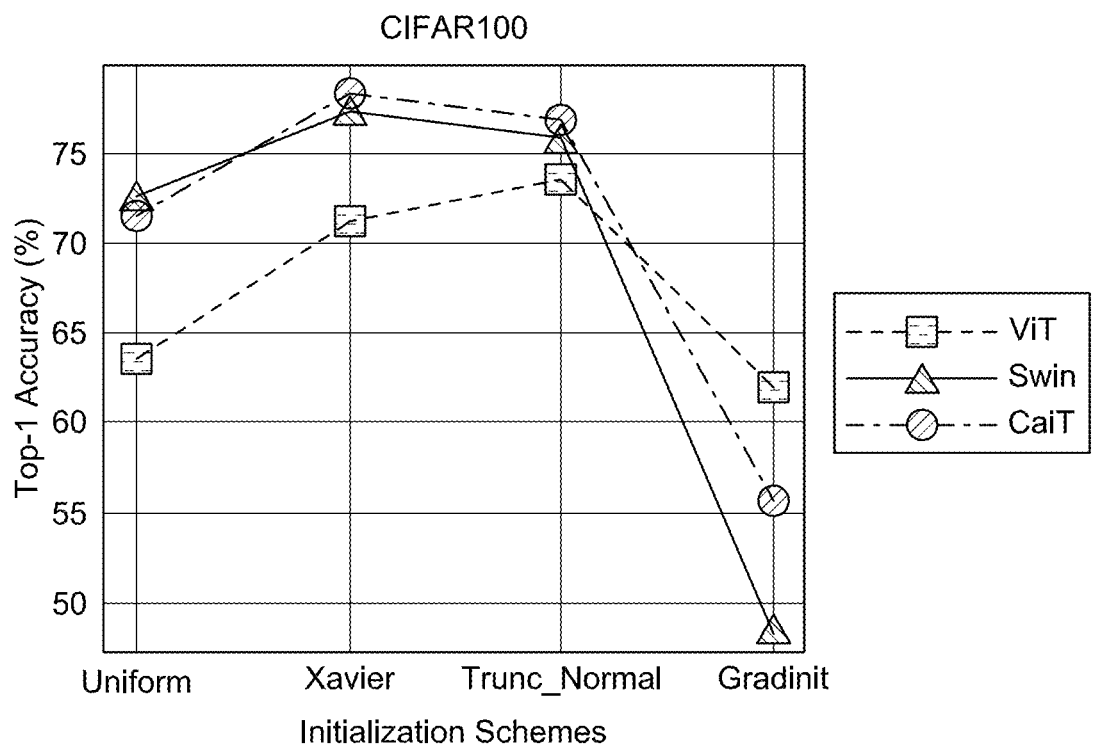
Figure 3C:
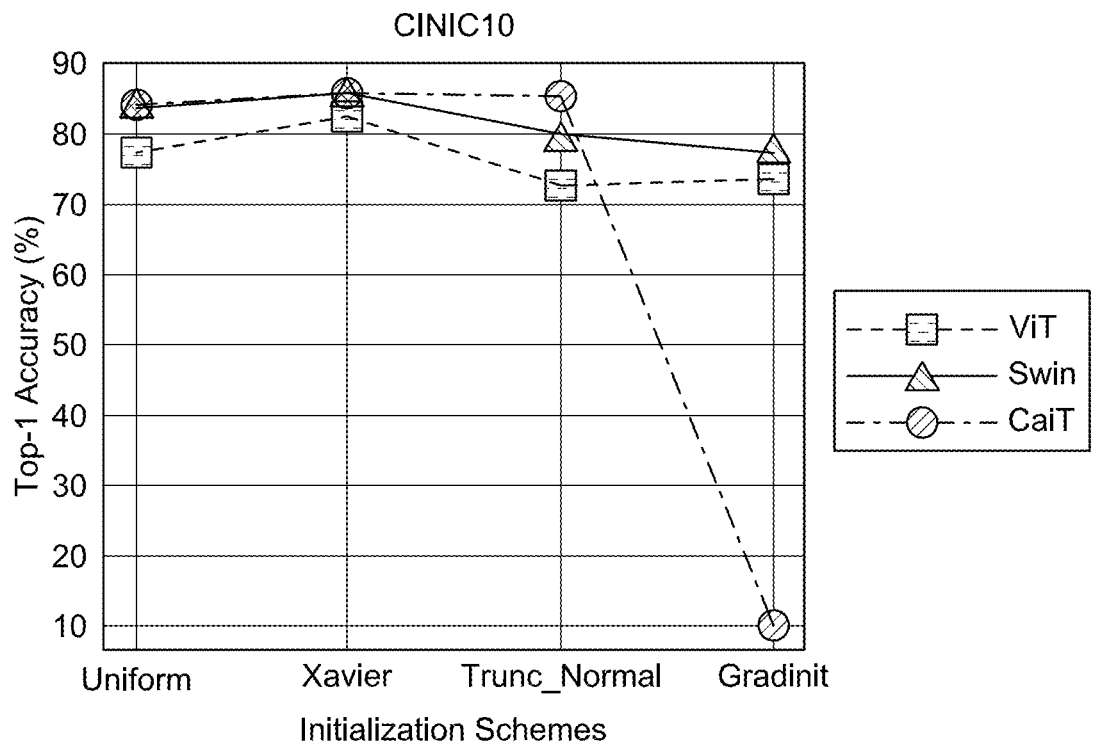
Figure 3D:
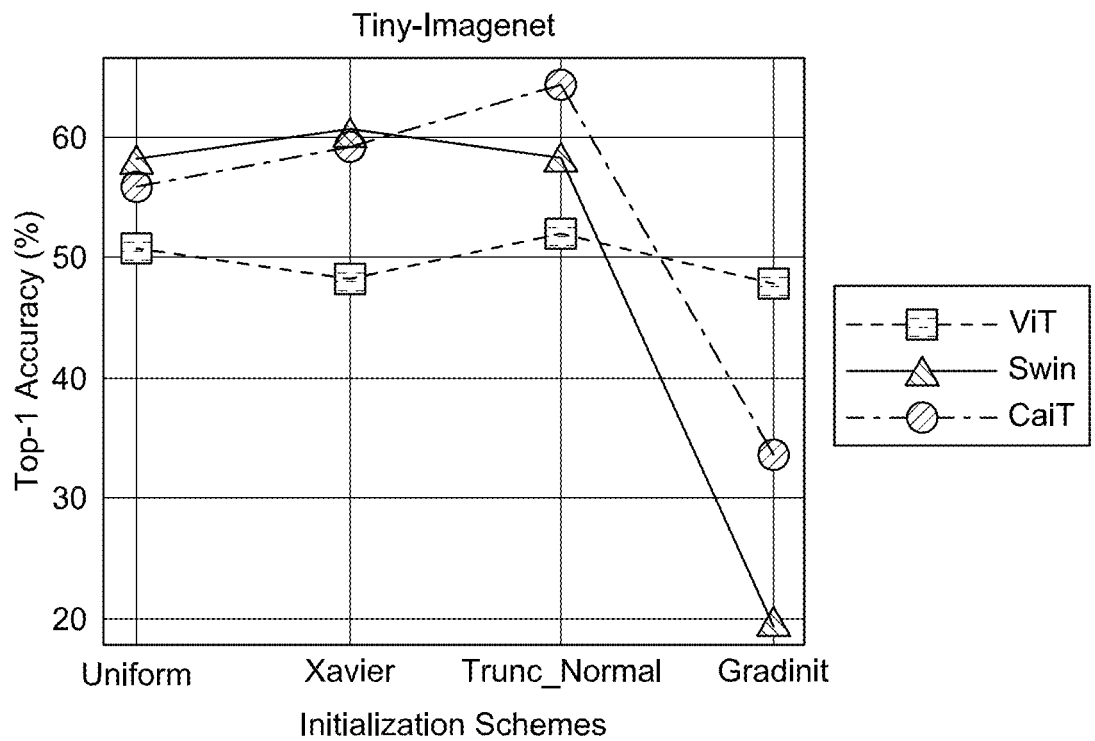

FIG. 2 is a diagram of a machine learning system in accordance with an exemplary aspect of the disclosure. In an exemplary embodiment, a server 202 or artificial intelligence (AI) workstation may be configured for medical image segmentation for medical diagnosis. With such a configuration, one or more client computers 212 may be used to perform medical image segmentation for several medical images at a time. In the embodiment, the server 202 may be connected to a cloud service 210. The cloud service 210 may be accessible via the Internet. The cloud service 210 may provide a database system and may serve streaming video. Mobile devices 204, 206 may access medical images served by the cloud service 210. Viewers of the medical images served by the cloud service 210 may be provided with a medical diagnosis based on the segmented medical images.

An aspect is a medical diagnosis service having one or more servers 202 and one or more client computers 212. Medical images may be obtained from various imaging and/or scanning devices 230 and stored in a database 220. Among the various devices 230 can include CT scanning devices or MRI imaging devices, to name a few. The medical diagnosis service can make a medical diagnosis, so that viewers, users and/or physicians can make informed decisions of a likely medical diagnosis based on a medical image. In some embodiments, the medical images are cellular images taken with a microscope.

FIGS. 3A, 3B, 3C, 3D are graphs of vision transformers trained with different weight initialization schemes. As mentioned above, it has been determined that neural networks are sensitive to weight initialization schemes. See Boris Hanin and David Rolnick. How to start training: The effect of initialization and architecture. *Advances in Neural Information Processing Systems*, 31, 2018, incorporated herein by reference in its entirety. To better understand the sensitivity to weight initialization, several vision transformers are trained with different weight initialization schemes including 'Uniform', 'Xavier', 'Truncated normal', and 'Gradinit'. All models are trained for 100 epochs. The default training setting for small-scale datasets as proposed by Lee et al. are used in all experiments for consistent comparisons. The graphs illustrate that ViT training can be un-stable depending upon weight initializations e.g., CiaT performs poorly when initialized with Gradinit. See Touvron et al. (*International Conference on Computer Vision* (2021)). Similarly, the generalization of VIT and Swin varies a lot with different weight initialization methods.

Figure 4:
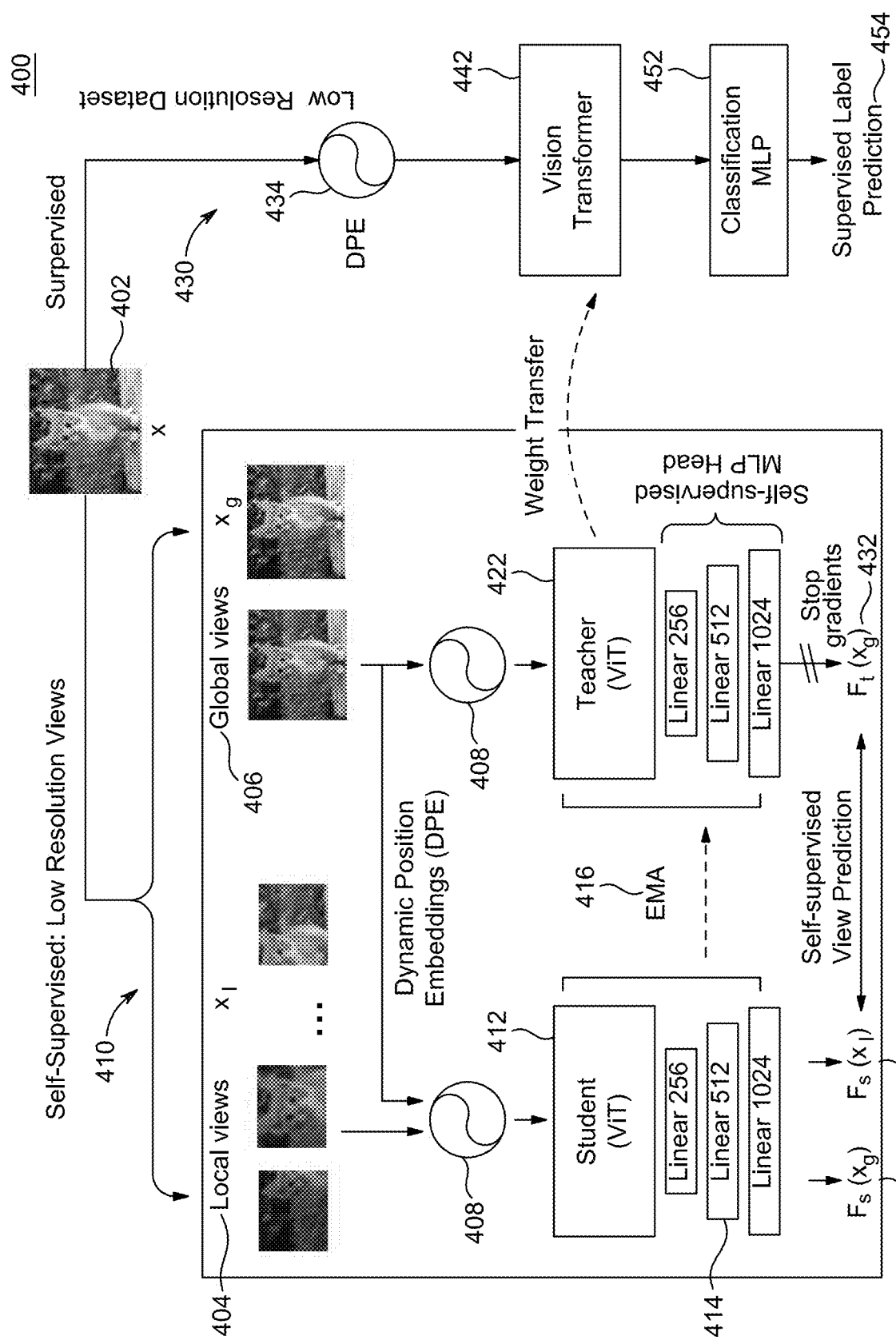
FIG. 4 is a block diagram for a training framework, in accordance with an exemplary aspect of the disclosure.

FIG. 4 is a flow diagram and framework for a training method, in accordance with an exemplary aspect of the disclosure The present framework 400 provides a solution to the wide variation in results due to weight initialization problem The present framework 400 learns a weight initialization from the given data distribution (Q) in a manner that injects necessary inductive biases within the ViT architecture. The present training method consists of two stages including Self-supervised View Prediction 410 followed by Supervised Label Prediction 430 tasks. Both of these tasks are trained on the same data distribution (Q) with the same model backbone $\mathcal{F}$. An architectural difference between both learning tasks is the self-supervised multi-layer projection (MLP) 414 vs supervised MLP projection 452. In this manner, the present training method does not depend on large-scale pretraining. ViT encoder designs are described next.

In order to demonstrate the ability of the present training method to handle different ViTs, different monolithic and non-monolithic (Swin and CaiT) ViTs are trained (Table 1) as encoders. See Touvron et al (*International Conference on Machine Learning*); Ze Liu et al.; and Touvron et al. (*Proceedings of the IEEE CVF International Conference on Computer Vision*).

DeiT (Data-Efficient Image Transformer)

Figure 5:
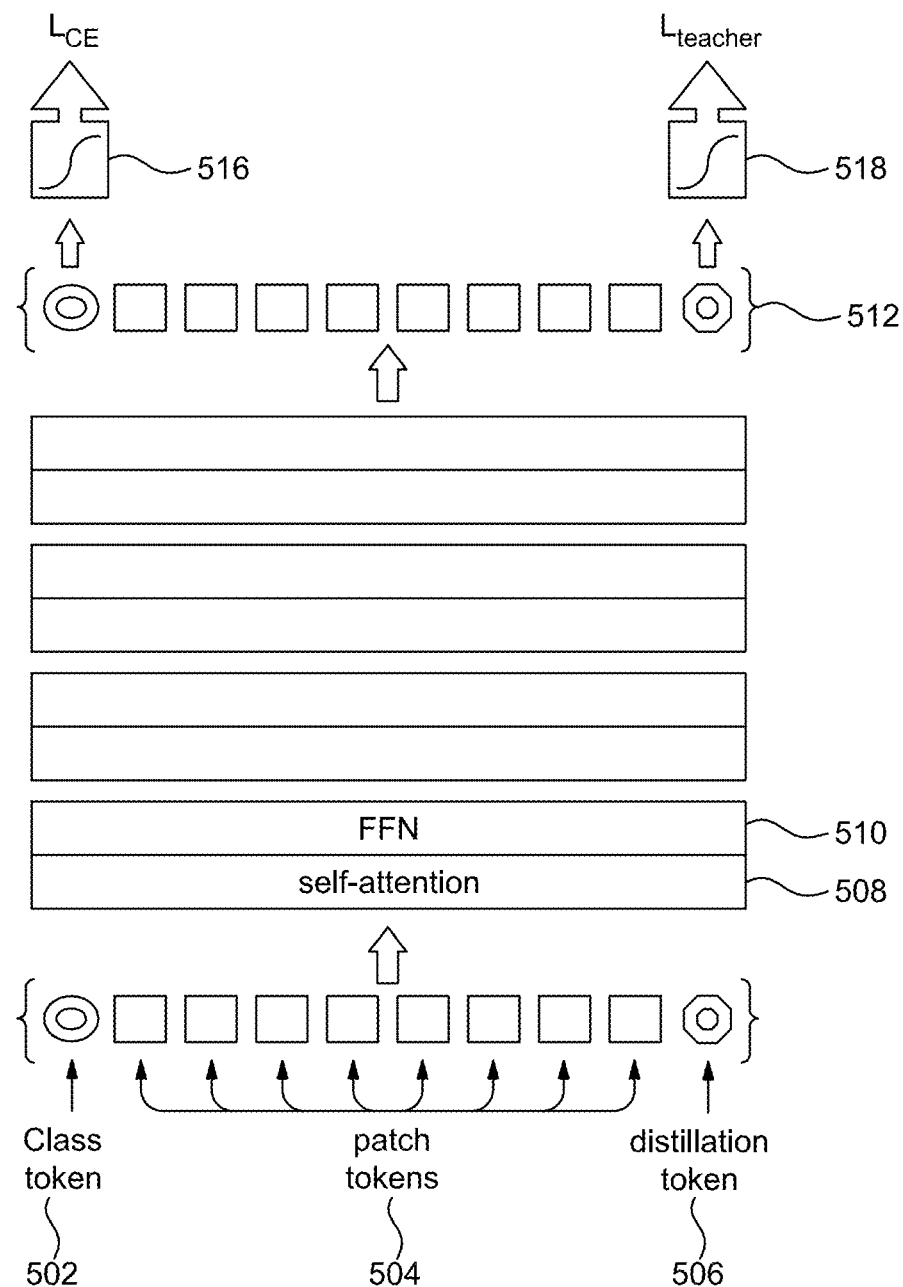
FIG. 5 is a block diagram of a DeiT vision transformer architecture.

FIG. 5 is a block diagram of an architecture of the DeiT. The DeiT model includes a teacher-student strategy specific to transformers. It relies on a distillation token ensuring that the student learns from the teacher through attention. The DeiT model adds a new token, the distillation token 504, to the initial embeddings (patches 504 and class 502 token). The class token is a trainable vector, appended to the patch tokens before the first layer, that goes through the transformer layers, and is then projected with a linear layer to predict the class. The distillation token 506 is used similarly as the class token 502. It interacts with other embeddings through self-attention 508 and is output by the network after the last layer. To get a full transformer block a Feed-Forward Network (FFN) 510 is added on top of the self-attention layer 508. This FFN 510 is composed of two linear layers separated by a GeLu activation.

In an embodiment, the full transformer model is used in each of the student 412, teacher 422 and vision transformer 442.

In the original DeiT, the target objective is given by the distillation component of the loss. The target objective uses a hard-label distillation. Hard-label distillation is a variant of distillation where the hard decision of the teacher is taken as a true label. Let Zs be the logits of the student model. $\mathcal{L}$ CE is the cross-entropy 516, y is the softmax function. Let $y_t$=argmaxc$Z_t$(c) 518 be the hard decision of the teacher. The objective associated with this hard-label distillation is:

$$L_{global}^{hardDistill} = \frac{1}{2}L_{CE}(\psi(Z_S), y) + \frac{1}{2}L_{CE}(\psi(Z_S), y_t)$$

For a given image, the hard label associated with the teacher may change depending on the specific data augmentation. The teacher prediction $y_t$ plays the same role as the true label y.

The distillation embedding allows the model to learn from the output of the teacher 512, as in a regular distillation, while remaining complementary to the class embedding.

Swin (Shifted window transformer)

Figure 6A:
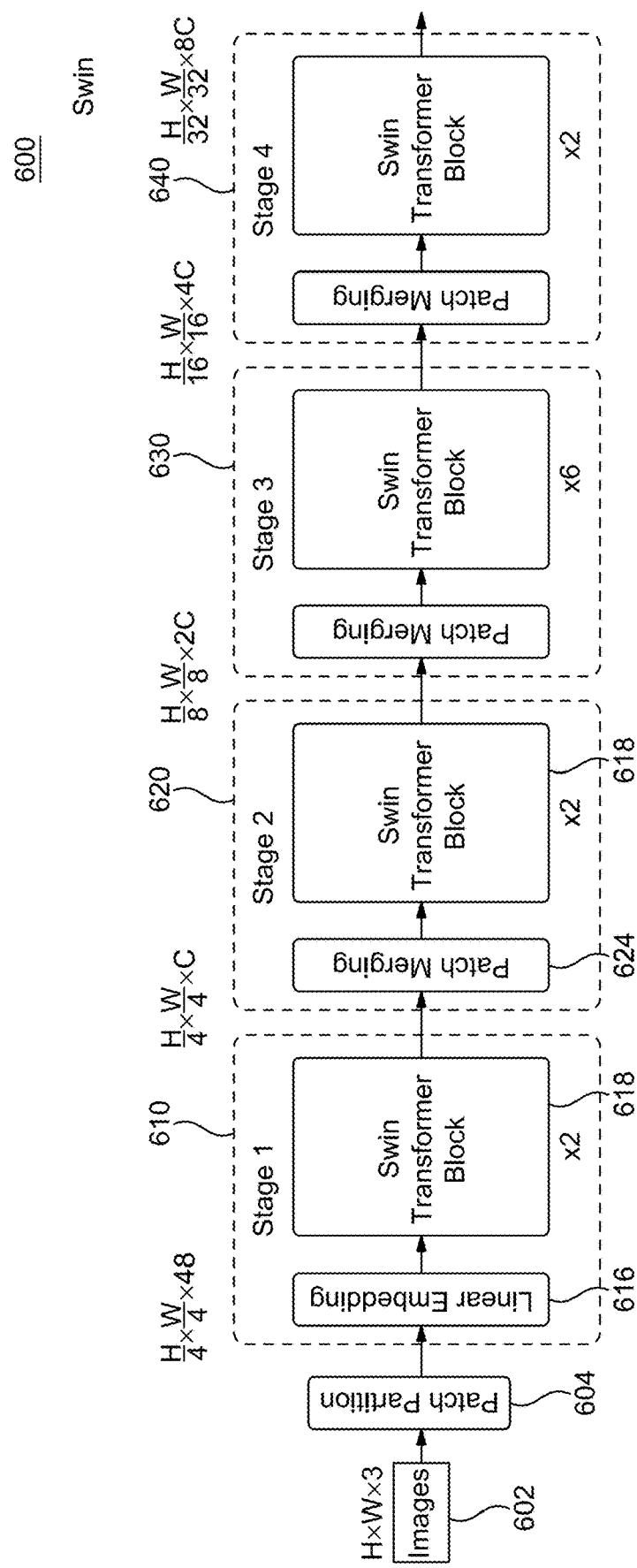
FIGS. 6A, 6B is a block diagram of a Swin vision transformer architecture.

FIG. 6A is a block diagram of the Swin Transformer architecture. FIG. 6A illustrates the tiny version (Swin-T). It first splits an input RGB image 602 into non-overlapping patches by a patch splitting module 604, like ViT. Each patch is treated as a "token" and its feature is set as a concatenation of the raw pixel RGB values. In implementation, a patch size of 4×4 is used and thus the feature dimension of each patch is 4×4×3=48. A linear embedding layer 616 is applied on this raw-valued feature to project it to an arbitrary dimension (denoted as C).

Several Transformer blocks with modified self-attention computation (Swin Transformer blocks 618) are applied on these patch tokens. The Transformer blocks maintain the number of tokens (H/4×H/4), and together with the linear embedding are referred to as Stage 1 (610).

To produce a hierarchical representation, the number of tokens is reduced by patch merging layers as the network gets deeper. The first patch merging layer concatenates the features of each group of 2×2 neighboring patches, and applies a linear layer on the 4C-dimensional concatenated features. This reduces the number of tokens by a multiple of 2×2=4 (2×downsampling of resolution), and the out-put dimension is set to 2C. Swin Transformer blocks 618 are applied afterwards for feature transformation, with the resolution kept at H/8×H/8. This first block of patch merging and feature transformation is denoted as Stage 2 (620). The procedure is repeated twice, as Stage 3 (630) and Stage 4 (640), with output resolutions of H/16×H/16 and H/32×H/32, respectively. These stages jointly produce a hierarchical representation, with the same feature map resolutions as those of typical convolutional networks, e.g., VGG and ResNet. As a result, the proposed architecture can conveniently replace the backbone networks in existing methods for various vision tasks.

Figure 6B:
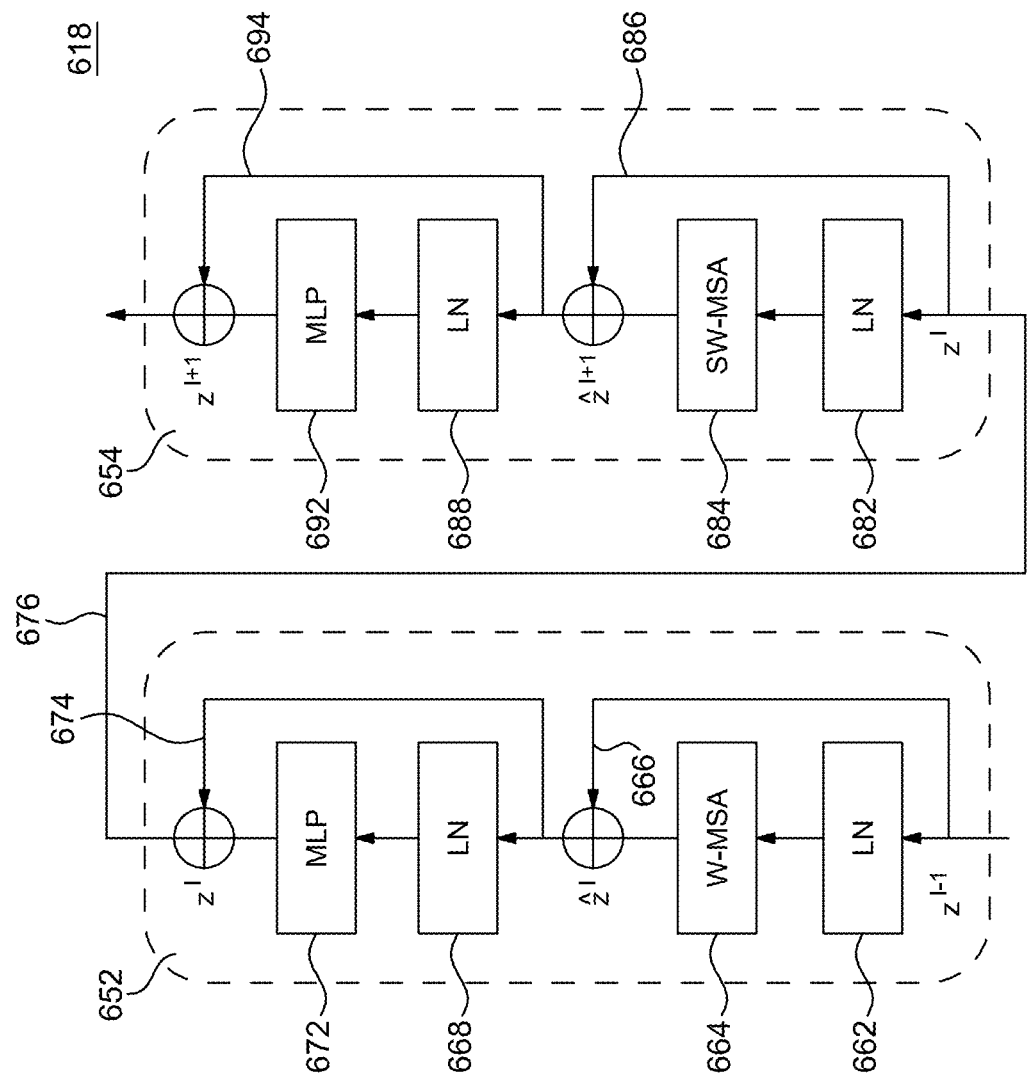

Swin Transformer block Swin Transformer 618 is built by replacing the standard multi-head self attention (MSA) module in a Transformer block by a module based on shifted windows, with other layers kept the same. As illustrated in FIG. 6B, a Swin Transformer block 618 includes a shifted window based MSA module 684, followed by a 2-layer MLP 692 with GELU non-linearity in between. A Layer-Norm (LN) layer 682 is applied before each MSA module 684 and each MLP 692, and a residual connection 686, 694 is applied after each module.

W-MSA 664 and SW-MSA 684 denote window based multi-head self-attention using regular and shifted window partitioning configurations, respectively. The first module, W-MSA 664, uses a regular window partitioning strategy which starts from the top-left pixel, and the 8_8 feature map is evenly partitioned into 2×2 windows of size 4×4 (M=4). Then, the next module, SW-MSA 684, adopts a windowing configuration that is shifted from that of the preceding layer, by displacing the windows by [M/2], [M/2]) pixels from the regularly partitioned windows.

The shifted window partitioning approach introduces connections between neighboring non-overlapping windows in the previous layer and is found to be effective in image classification, object detection, and semantic segmentation.

CaiT (Class-Attention in Image Transformers)

Figure 7:
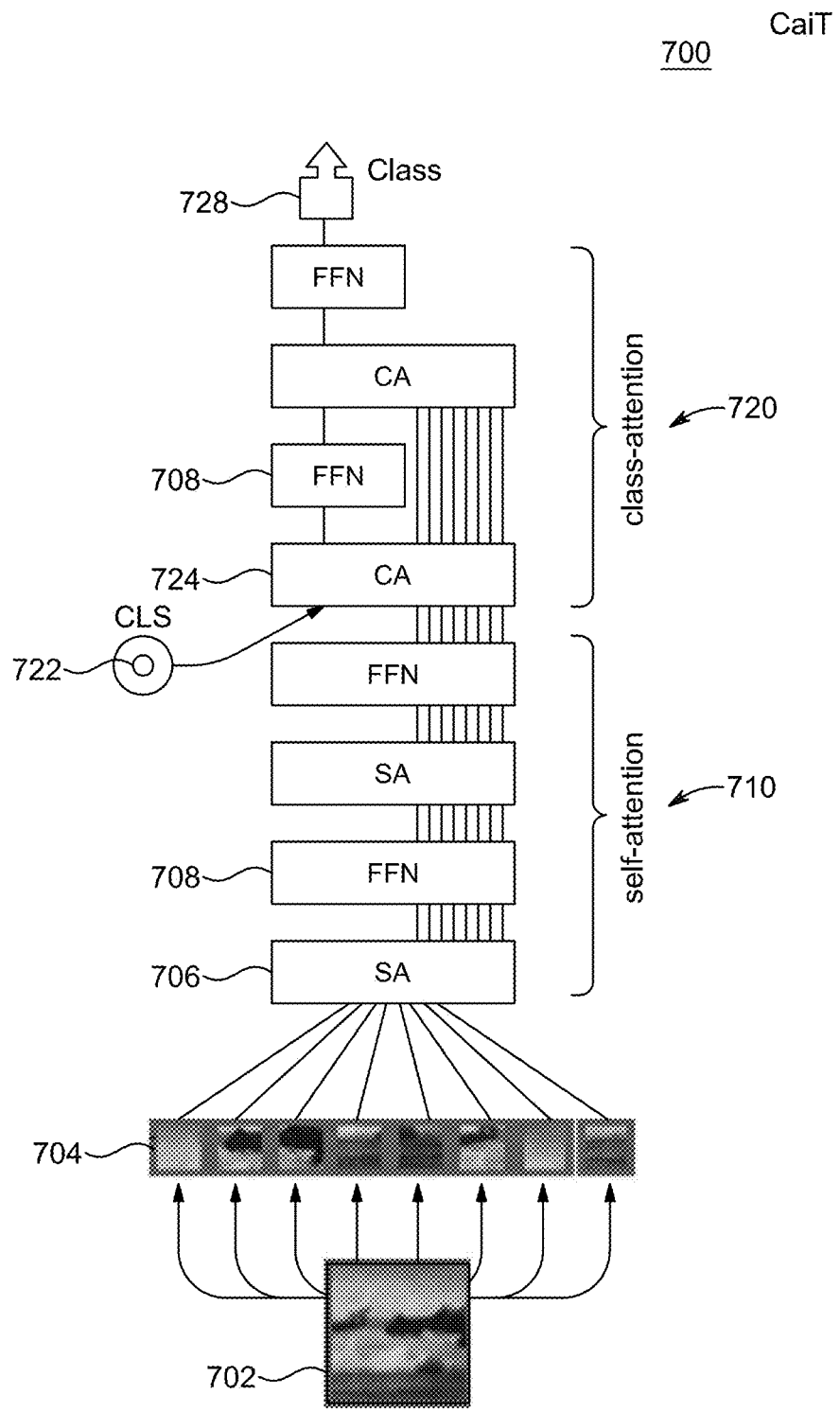
FIG. 7 is a block diagram of a CaiT vision transformer architecture.

FIG. 7 is a block diagram of the CaiT architecture. This architecture aims at circumventing one of the problems of the ViT architecture: the learned weights are asked to optimize two contradictory objectives: (1) guiding the self-attention between patches while (2) summarizing the information useful to the linear classifier. The CaiT architecture 700 explicitly separate the two stages. The two stages include a self-attention stage 710 and a class-attention stage 720. The self-attention stage 710 is identical to a conventional VIT transformer and receives patch embeddings 704. The class-attention stage 720 is a set of layers that compiles the set of patch embeddings for an input image 702 into a class embedding CLS 722 that is subsequently fed to a linear classifier 728.

This class-attention alternates in turn a layer that is referred to as a multi-head class-attention (CA 724), and a FFN 708 layer. In this stage, only the class embedding 722 is updated. Similar to the embedding fed in ViT and DeiT on input of the transformer, it is a learnable vector. The main difference is that, in the CeiT architecture 700, information is not copied from the class embedding to the patch embeddings during the forward pass. Only the class embedding 722 is updated by residual in the CA 724 and FFN 708 processing of the class-attention stage 720.

The role of the CA layer 724 is to extract the information from the set of processed patches. It is identical to a SA layer 706, except that it relies on the attention between (i) the class embedding xclass (initialized at CLS in the first CA) and (ii) itself plus the set of frozen patch embeddings xpatches.

These three ViTs are originally designed for higher resolution inputs (224 or 384) with patch sizes of 16 or 32. However, small-scale datasets have low resolution inputs e.g. 32 or 64 in the case of CIFAR and Tiny-ImageNet, respectively. Therefore, the patch size is reduced for such low resolution inputs. Specifically, a patch size of 8 and 4 is set for an input of size 64×64 and 32×32, respectively. Similarly, the original ViT designs are adopted for small datasets following. See Maithra Raghu, Thomas Unterthiner, Simon Kornblith, Chiyuan Zhang, and Alexey Dosovitskiy. Do vision transformers see like convolutional neural networks? *Advances in Neural Information Processing Systems*, 34, 2021, incorporated herein by reference in its entirety. Table 1 presents the high level details of these network architectures. Further ablations with different ViT attributes (e.g. depth, and heads) are provided below.

TABLE 1

Details of ViTs encoders used in the present training method.

| | Attributes | | | | |
|---|---|---|---|---|---|
| | Depth | Patch-size | Token Dimension | Heads | MLP-ratio | Window-size |
| ViT | 9 | [4, 8] | 192 | 12 | 2 | — |
| Swin | [2, 4, 6] | [2, 4] | 96 | [3, 6, 12] | 2 | 4 |
| CaiT | 24 | [4, 8] | 192 | 4 | 2 | — |

Exploring ViT Attributes: Depth, Attention-Heads

The attributes of a ViT architecture are modified and the effect on model generalization are observed (top-1 accuracy %) across CIFAR100 and Tiny-Imagenet datasets (Table 2). Specifically, the depth and attention heads are varied to study the relation between ViT parameter complexity and its generalization. Depth is the number of transformer layers. The analysis highlights the following insights: First, for a given training method, the performance of model improves as the number of self-attention blocks is increased (e.g., six to nine), however, a decrease in generalization occurs by further increasing the self-attention blocks (e.g., at 12). This finding is consistent with Raghu et al. that shows the reduced locality (inductive bias) within ViTs with a higher number of self-attention layers which adds to further difficulty to ViT optimization. Second, increasing number of heads within self-attention bring more diversity during training and lead to better results. Third, the present approach outperforms the baseline methods in all the given settings, validating the necessity of self-supervised weight initialization during supervised learning.

TABLE 2

The effect of ViT architectural attributes on its generalization.

| | | ViT-Scratch | | ViT-Drloc | | SL-VIT | | ViT (Present) | |
|---|---|---|---|---|---|---|---|---|---|
| Depth | Heads | CIFAR100 | T-Imagenet | CIFAR100 | T-Imagenet | CIFAR100 | T-Imagenet | CIFAR100 | T-Imagenet |
| 6 | 12 | 69.75 | 53.44 | 51.97 | 36.69 | 71.93 | 54.94 | 75.14 | 59.15 |
| 6 | 6 | 68.76 | 52.25 | 53.12 | 39.12 | 71.01 | 53.68 | 72.92 | 55.83 |
| 9 | 12 | 73.81 | 57.07 | 58.29 | 42.33 | 76.92 | 61.00 | 79.15 | 63.36 |
| 9 | 6 | 69.88 | 53.56 | 55.50 | 45.93 | 72.01 | 54.63 | 73.59 | 58.18 |
| 12 | 3 | 68.09 | 51.26 | 57.18 | 43.50 | 72.14 | 52.98 | 68.88 | 52.89 |
| 12 | 12 | 71.23 | 54.55 | 56.50 | 45.71 | 74.04 | 56.13 | 77.22 | 56.41 |
| 12 | 6 | 70.57 | 53.42 | 58.58 | 46.78 | 73.23 | 55.38 | 73.93 | 58.46 |

Self-Supervised View Prediction as Weight Initialization Scheme

The weights are initialized for low resolution small-scale datasets via a self-supervised training stage 410. Among many self-supervised learning methods, a view prediction strategy is used. See Ting Chen, Simon Kornblith, Mohammad Norouzi, and Geoffrey Hinton. A simple framework for contrastive learning of visual representations. In *International conference on machine learning*, pages 1597-1607. PMLR, 2020; Xinlei Chen, Saining Xie, and Kaiming He. An empirical study of training self-supervised vision transformers. In *Proceedings of the IEEE/CVF International Conference on Computer Vision*, pages 9640-9649, 2021; and Kanchana Ranasinghe, Muzammal Naseer, Salman Khan, Fahad Shahbaz Khan, and Michael Ryoo. Self-supervised video transformer. In *IEEE/CVF International Conference on Computer Vision and Pattern Recognition*, June 2022, each incorporated herein by reference in their entirety. The self-supervised view prediction stage 410 does not require memory bank, large batch-size, or negative mining. The self-supervised weights are used for initialization during fine-tuning stage 430 directly from the low-resolution dataset. The view prediction pre-training 410 uses a student 412 ($\mathcal{F}_s$) and teacher 422 ($\mathcal{F}_t$) framework to predict different views of the same input sample 402 from each other and thus follows the learning paradigm of knowledge self-distillation. See Jean-Bastien Grill, Florian Strub, Florent Altché, Corentin Tallec, Pierre Richemond, Elena Buchatskaya, Carl Doersch, Bernardo Avila Pires, Zhaohan Guo, Mohammad Gheshlaghi Azar, et al. Bootstrap your own latent—a new approach to self-supervised learning. *Advances in Neural Information Processing Systems*, 33:21271-21284, 2020, incorporated herein by reference in its entirety. Both student 412 and teacher 422 represent the same ViT network but process different views as explained next.

In the self-supervised view generation and prediction stage 410 a low resolution input 402 x sampled from a small data distribution $Q$. The height and width of the low-resolution input x is defined by h and w, respectively. During pre-training, the input is distorted and augmented to generate global 406 ($x_g$) and local 404 ($x_l$) views. Augmentations are used which preserve the semantic information of each selected view. See Caron et al. These augmentations include color jitter, gray scaling, solarization, random horizontal flip and gaussian blur. Global views 406 are generated by randomly selecting regions in the input image covering more than 50% of the input portion, while local views 404 are generated by randomly selecting regions covering around 20-50% portion of the input image 402. The global 406 and local 404 views are further resized such that the ratio of area of local to global view is 1:4. For example, the global view 406 generated for CIFAR sample is resized to a dimension of 32×32 and the local view 404 is resized to 16×16. Two global 406 and eight local 404 views are used to demonstrate the present method. The number of input tokens vary based on the view size, so the training method 400 uses Dynamic Position Embeddings 408 (DPE) which interpolates for the missing tokens of smaller views with height and width less than the original sample size h×w. Both student 412 and teacher 422 networks process these multi-sized views and output the corresponding feature representations. The features representation of each view is further processed by a 3-layer self-supervised MLP Projection (MLP 414) of the student 412 and teacher 422 networks. It has been determined that the multi-layer projection 414 performs better than a single layer MLP. Thus, each low-resolution view is converted into 1024 dimensional feature vector. Ablative analysis on the effect of the output size of self-supervised MLP projection head is provided below.

The teacher network 422 processes the global views 406 to generate target features ($F_{g_t}$) 432 while all the local 410 and global 406 views are forward-passed through the student network 412 to generate predicted features ($F_{g_s}$) 426 and ($F_{l_s}$) 428. These features are normalized to obtain $\tilde{F}_{g_t}, \tilde{F}_{g_s},$ and $\tilde{F}_{l_s}$. The student's parameters are updated by minimizing the following objective:

$$\mathcal{L} = -\tilde{F}_{g_t} \cdot \log(\tilde{F}_{g_s}) + \sum_{i=1}^{n} -\tilde{F}_{g_t} \cdot \log(\tilde{F}_{l_s}^{(i)}), \quad (1)$$

where n represent number of local views 404 specifically set to 8. The teacher parameters are updated via exponential moving average (EMA) 416 of the student weights using: $\theta_t \leftarrow \lambda \theta_t + (1-\lambda)\theta_s$ where $\theta_t$ and $\theta_s$ denote the parameters of teacher 422 and student 412 network respectively and, $\lambda$ follows the cosine schedule from 0.996 to 1 during training. Further, centering and sharpening operations are applied to the teacher output. This way the present method avoids any mode collapse similar to BYOL and converge to a unique solution. See Jean-Bastien Grill, Florian Strub, Florent Altche, Corentin Tallec, Pierre Richemond, Elena Buchatskaya, Carl Doersch, Bernardo Avila Pires, Zhaohan Guo, Mohammad Gheshlaghi Azar, et al. Bootstrap your own latent—a new approach to self-supervised learning. *Advances in neural information processing systems*, 33:21271-21284, 2020, each incorporated herein by reference in their entirety.

The self-supervised view prediction objective (Eq. 1) on low resolution inputs induces locality in the vision transformer and encourages better intermediate feature representations which further aids during the fine-tuning stage on the same dataset.

Self-Supervised to Supervised Label Prediction

The present two-stage framework 400 effectively trains vision transformers 442 on small-scale low resolution datasets from scratch. In Caron et al., a student-teacher framework is trained by self-supervised learning. Also, in Caron et al., the self-supervised learning begins by constructing different distorted views of an image with multi-crop strategy. For a given image, a set contains global views and local views of smaller resolution. All crops are passed through the student while only the global views are passed through the teacher, in order to encourage local-to-global correspondences. Both networks share the same architecture with different sets of parameters.

Unlike the self-supervised learning of Caron et al., the present self-supervised to supervised learning initializes a given model with weights learned via the self-supervised stage 410 on the target dataset and then fine-tunes the model in the supervised learning stage 430 on the same corresponding dataset. Conventional practices initialize the models with different initialization schemes or ImageNet pre-trained weights. After the initialization, the present self-supervised to supervised learning stage 430 transfers weights from the teacher network 422 to a vision transformer 442 and replaces the self-supervised MLP projection head 414 with a randomly initialized MLP classifier 452. The model is then trained via supervised objective as follows:

$$\mathcal{L}_{CE} = -\sum_{i=1}^{k} y_i \cdot \log(\mathcal{F}(x)_i), \quad (2)$$

where k is the output dimension of the final classifier and y represents the one-hot encoded ground-truth.

The classification MLP 452 provides a predicted classification or semantic segmentation labels 454. The teacher 422 provides high quality target features during pretraining and hence proves useful for the fine-tuning stage 430. The ablation on the effect self-supervised weights is provided below in Table 6.

Experimental Protocols

Experimental settings include dataset and training details, qualitative, and ablative analysis.

Datasets: The present approach is validated on five small-scale, low-resolution datasets including Tiny-Imagenet, CINIC10, CIFAR10, CIFAR100 and SVHN. See Ya Le and Xuan Yang. Tiny imagenet visual recognition challenge. *CS 231N*, 7(7):3, 2015; Luke N. Darlow, Elliot J. Crowley, Antreas Antoniou, and Amos J. Storkey. Cinic-10 is not imagenet or cifar-10, 2018. URL https_://arxiv.org/abs/1810.03505; Alex Krizhevsky, Geoffrey Hinton, et al. Learning multiple layers of features from tiny images. *Citeseer*, 2009; and Ian J. Goodfellow, Yaroslav Bulatov, Julian Ibarz, Sacha Arnoud, and Vinay Shet. Multi-digit number recognition from street view imagery using deep convolutional neural networks, 2013. URL https_://arxiv.org/abs/1312.6082, each incorporated herein by reference in their entirety. Details about the dataset size, sample resolution and the number of classes are provided in Table 3. Self-supervised initialization is learned directly from small datasets. This allows to train ViTs on these datasets without any large-scale pre-training.

TABLE 3

Information for self-supervised.

| Dataset | Train Size | Test Size | Dimensions | # Classes |
|---|---|---|---|---|
| Tiny-Imagenet | 100,000 | 10,000 | 64 × 64 | 200 |
| CIFAR10 | 50,000 | 10,000 | 32 × 32 | 10 |
| CIFAR100 | 50,000 | 10,000 | 32 × 32 | 100 |
| CINIC10 | 90,000 | 90,000 | 32 × 32 | 10 |
| SVHN | 73.257 | 26,032 | 32 × 32 | 10 |

Self-supervised Training Setup: All models are trained with the Adam optimizer and a batch size of 256 via distributed learning over 4 Nvidia V100 32 GB GPUs. See Diederik P Kingma and Jimmy Ba. Adam: A method for stochastic optimization. arXiv preprint arXiv: 1412.6980, 2014, incorporated herein by reference in its entirety. The learning rate is linearly ramped up during the first 10 epochs using:

$$lr = 0.0005 * \frac{\text{Batch size}}{256}.$$

After first 10 epochs, learning rate follows the cosine schedule. See Ilya Loshchilov and Frank Hutter. Sgdr: Stochastic gradient descent with warm restarts. arXiv preprint arXiv: 1608.03983, 2016, incorporated herein by reference in its entirety. The student and teacher outputs are based on a temperature parameter which is set to 0.1 for the student network, while it follows a linear warm-up from 0.04 to 0.07 for the teacher network.

Supervised Training Setup: The training framework of Lee et al. is used for supervised learning and applies standard data augmentations for consistency. Specifically, cutmix, mixup, auto-augment, and repeated augment are used. See Yun et al.; Ekin D Cubuk, Barret Zoph, Dandelion Mane, Vijay Vasudevan, and Quoc V Le. Autoaugment: Learning augmentation policies from data. arXiv preprint arXiv: 1805.09501, 2018; and Cubuk et al. (2020), each incorporated herein by reference in their entirety. Further, label smoothing, stochastic depth, and random erasing are used. See Szegedy et al (2016); Gao Huang, Yu Sun, Zhuang Liu, Daniel Sedra, and Kilian Q Weinberger. Deep networks with stochastic depth. In European conference on computer vision, pages 646-661. Springer, 2016; and Zhong et al., each incorporated herein by reference in their entirety. All models are trained for 100 epochs with a batch size of 256 on a single Nvidia V100 32 GB GPU. Adam optimizer is used with a learning rate of 0.002 and learning decayed rate of 5e-2 with cosine scheduling.

Results

Generalization of different methods is provided with a comparative analysis presented in Table 4 across 3 different ViT architectures (Table 1). The present approach performs favorably well against different ViT baselines as well as CNNs without adding any additional parameters or requiring changes to architecture or loss functions. See Lee et al.; Yahui Liu et al. Note that all methods are trained on the original input resolution as provided in Table 1. A patch size of 8 is kept for Tiny-Imagenet to generate 16 number of input tokens for ViT and CaiT architectures. The patch size is reduced to 4 so that the resultant number of tokens become 64 for all other datasets such as CIFAR, SVHN, and CINIC10. Similarly, for Swin architecture, a patch size of 4 is used for Tiny-Imagenet to obtain 64 tokens, while for other datasets, a patch size of 2 is used which produces 256 number of input tokens. These architectural settings are consistently followed for all the baselines (Table 4). The present approach consistently performs better as compared to recent state-of-the-art methods (see Lee et al.; Yahui Liu et al.) for ViTs training on small-scale datasets (Table 4). Particularly, a significant gain is observed for the difficult cases where the ratio of number of classes vs. input samples is higher e.g. CIFAR100 and Tiny-ImageNet (Table 3). In this manner, the present approach paves the way to adopt ViTs to small datasets that also outperforms CNN based models. The effect of the present self-supervised weight initialization on convolutional networks is provided below.

TABLE 4

Generalization of different methods is provided with a comparative analysis.

| Model | Params(M) | Tiny-Imagenet | CIFAR10 | CIFAR100 | CINIC10 | SVHN |
|---|---|---|---|---|---|---|
| ResNet156 | 0.9 | 56.51 | 94.65 | 74.44 | 85.34 | 97.61 |
| ResNet110 | 1.7 | 59.77 | 95.27 | 76.18 | 86.81 | 97.82 |
| EfficientNet B0 | 4.0 | 55.48 | 88.38 | 61.64 | 75.64 | 96.96 |
| ResNet18 | 11.6 | 53.32 | 90.44 | 64.49 | 77.79 | 96.78 |
| ViT (scratch) | 2.8 | 57.07 | 93.58 | 73.81 | 83.73 | 97.82 |
| SL-ViT$_{(Arxiv'21)}$ | 2.9 | 61.07 | 94.53 | 76.92 | 84.48 | 97.79 |
| ViT-Drloc$_{(NeurIPS'21)}$ | 3.15 | 42.33 | 81.00 | 58.29 | 71.50 | 94.02 |
| ViT (Present) | 2.8 | 63.36 | 96.41 | 79.15 | 86.91 | 98.03 |
| Swin (scratch) | 7.1 | 60.05 | 93.97 | 77.32 | 83.75 | 97.83 |
| SL-Swin$_{(Arxiv'21)}$ | 10.2 | 64.95 | 94.93 | 79.99 | 87.22 | 97.92 |
| Swin-Drloc$_{(NeurIPS'21)}$ | 7.7 | 48.66 | 86.07 | 65.32 | 77.25 | 95.77 |
| Swin (Present) | 7.1 | 65.13 | 96.18 | 80.95 | 87.84 | 98.01 |
| CaiT (scratch) | 7.7 | 64.37 | 94.91 | 76.89 | 85.44 | 98.13 |
| SL-CaiT$_{(Arxiv'21)}$ | 9.2 | 67.18 | 95.81 | 80.32 | 86.97 | 98.28 |
| CaiT-DRLoc$_{(NeurIPS'21)}$ | 8.5 | 45.95 | 82.20 | 56.32 | 73.85 | 19.59 |
| CaiT (Present) | 7.7 | 67.46 | 96.42 | 80.79 | 88.27 | 98.18 |

Self-Supervised Weight Initialization for CNNs

The present self-supervised weight initialization strategy improves the performance of Vision Transformers. The effect on CNNs' performance is shown in Table 5. Specifically a ResNet-18 model is pre-trained on Tiny-Imagenet and CIFAR100 datasets with the present self-supervised view prediction objective and fine-tuned on the same datasets using supervised training framework. A slight improvement in model performance can be seen as shown in Table 5. This shows that the presence of inherent inductive biases ease the CNN optimization with non-learned weights initialization (such as Trunc Normal and Kaiming) in comparison to Vision Transformer.

TABLE 5

Effect of the self-supervised weight initialization scheme on CNNs.

| Model | Initialization | CIFAR100 | Tiny-Imagenet |
|---|---|---|---|
| ResNet-18 | Trunc Normal | 64.49 | 53.32 |
| ResNet-18 | Kaiming | 64.08 | 52.19 |
| ResNet-18 | Self-supervised (present) | 65.00 | 53.48 |

Robustness to Input Resolution and Patch Sizes: A recent method projects the input samples to higher resolution to train Vision Transformer e.g., input resolution of 32×32 for CIFAR is re-scaled to 224×224 during training. This significantly increases the number of input tokens and hence the quadratic complexity within self-attention (Table. 6). In comparison to the performance of the present training method improves significantly on higher resolution. Thus the present training method proves effective on both low as well as high input resolutions. In comparison, the present approach successfully trains ViTs on low resolution inputs while being computationally efficient. The present training method scales well on high resolution inputs and outperforms by notable margins. (Table 6). See Yahui Liu et al.

TABLE 6

The present training method scales well.

| Model | Method | Input Resolution | Patch-size | No. of Tokens | Params (M) | CIFAR10 | CIFAR100 | SVHN |
|---|---|---|---|---|---|---|---|---|
| Swin | Drloc | 224 × 224 | 4 | 3136 | 28 | 83.89 | 66.23 | 94.23 |
| Swin (Present) | Drloc | 32 × 32 | 2 | 64 | 7.7 | 86.07 | 65.32 | 95.77 |
| Swin (Present) | Present | 224 × 224 | 4 | 3136 | 7.7 | 92.04 | 73.46 | 96.86 |

Robustness to Natural Corruptions: Analysis of the mean corruption error on CIFAR10 and CIFAR100 in Table 7. Mean corruption error (lower is better) is reported against 18 natural corruptions. The present training approach increases the model robustness against 18 natural corruptions such as fog, rain, noise, and blur, etc. See Dan Hendrycks and Thomas Dietterich. Benchmarking neural network robustness to common corruptions and perturbations. In *International Conference on Learning Representations*, 2018, incorporated herein by reference in its entirety.

TABLE 7

Analysis of the mean corruption error on CIFAR10 and CIFAR100.

| Data | ViT (scratch) | SL-ViT | ViT (Present) | Swin (scratch) | SL-Swin | Swin (Present) |
|---|---|---|---|---|---|---|
| CIFAR10 | 39.93 | 26.42 | 26.01 | 36.13 | 26.28 | 25.38 |
| CIFAR100 | 65.04 | 48.56 | 48.10 | 53.83 | 47.29 | 45.10 |

Attention to Salient Regions

Figure 8A:
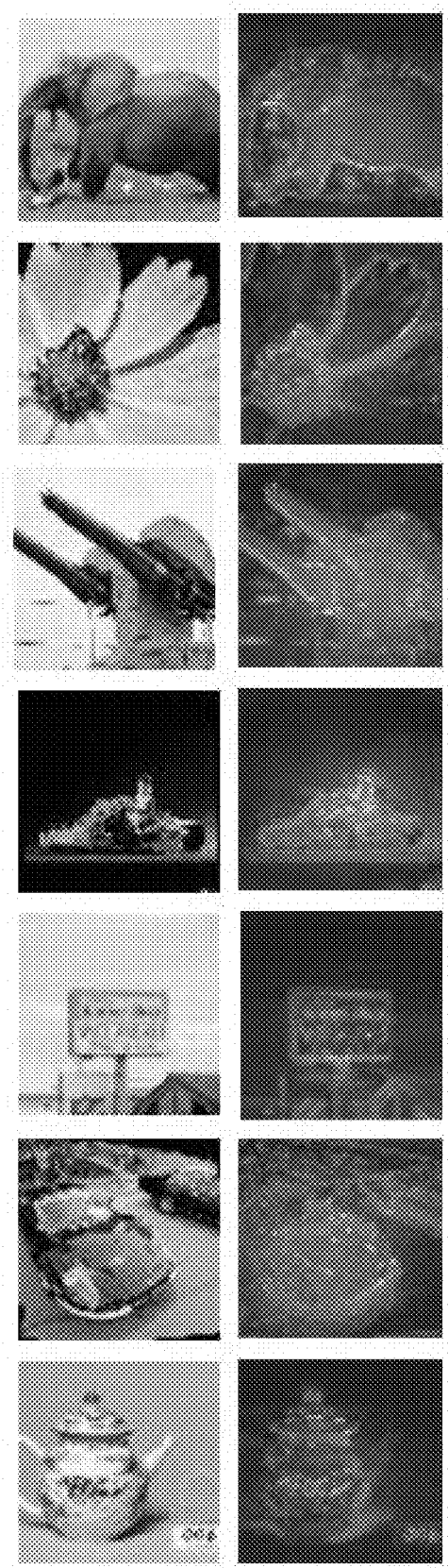
FIGS. 8A, 8B, 8C illustrate CLS tokens from heads of the last block of a vision transformer on low-resolution test samples from Tiny-ImageNet.
Figure 8B:
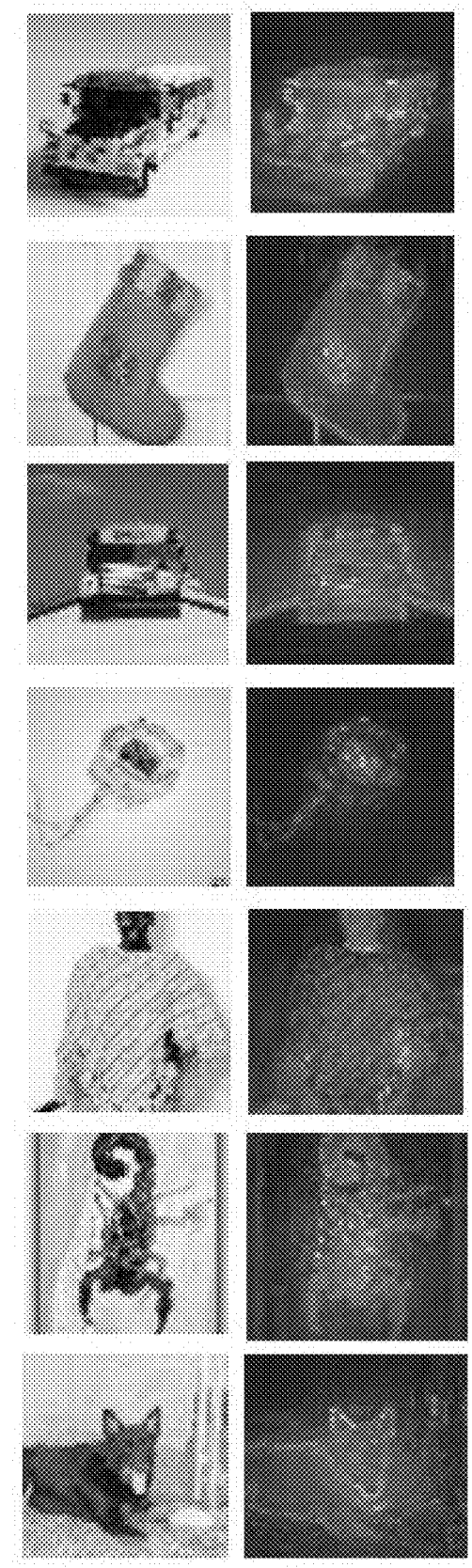
Figure 8C:
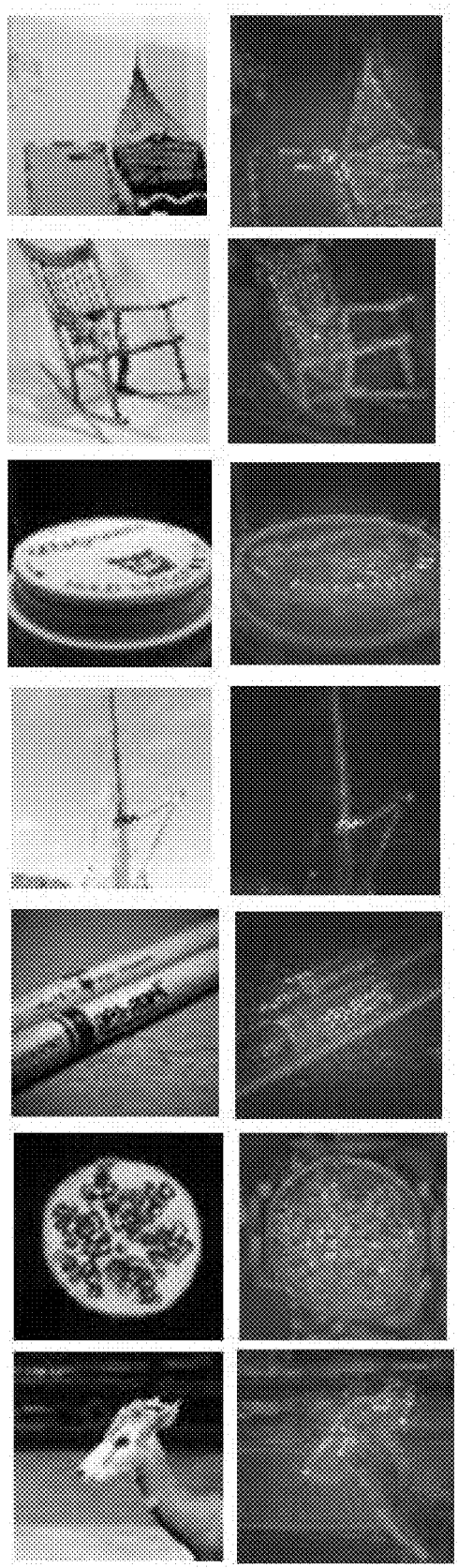
Figure 9A:
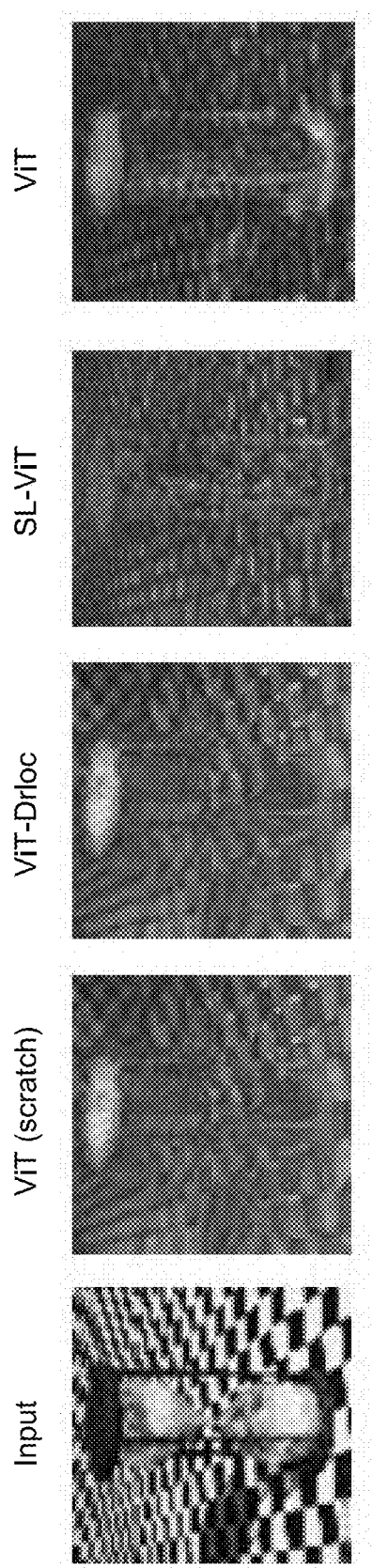
FIGS. 9A-9G illustrate the attention of the CLS token from the heads of the last block of ViT across different approaches.
Figure 9B:
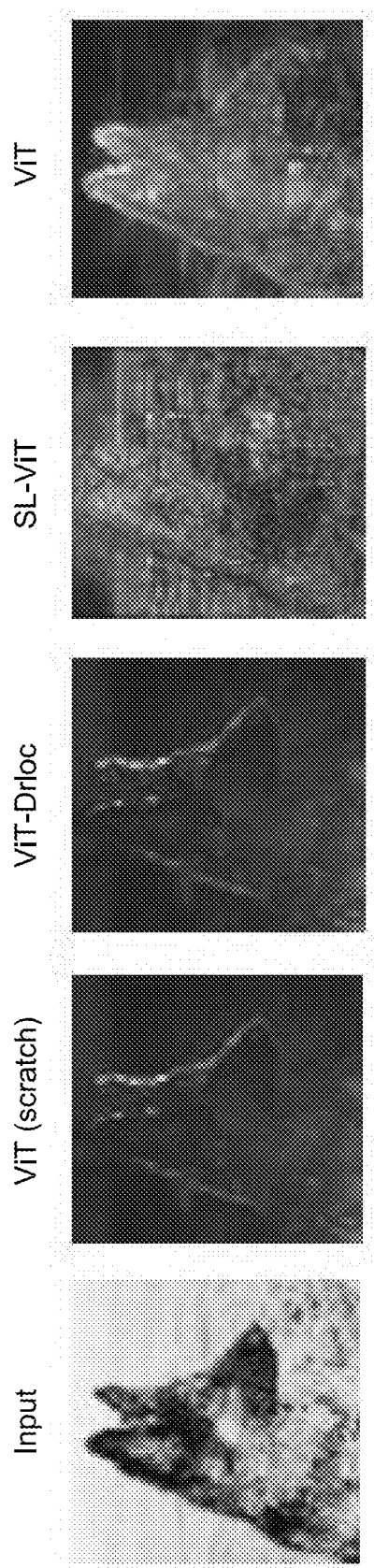
Figure 9C:
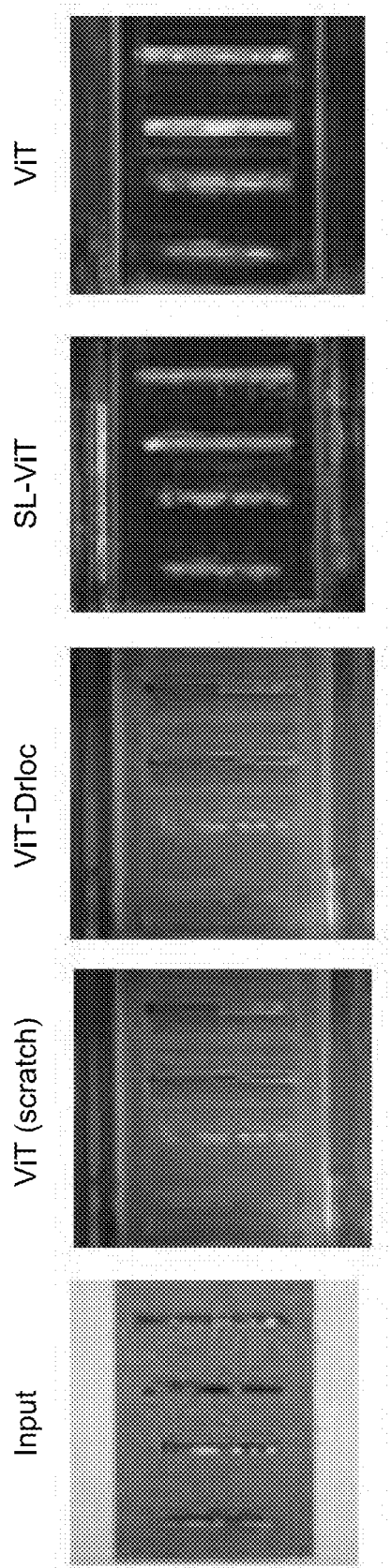
Figure 9D:
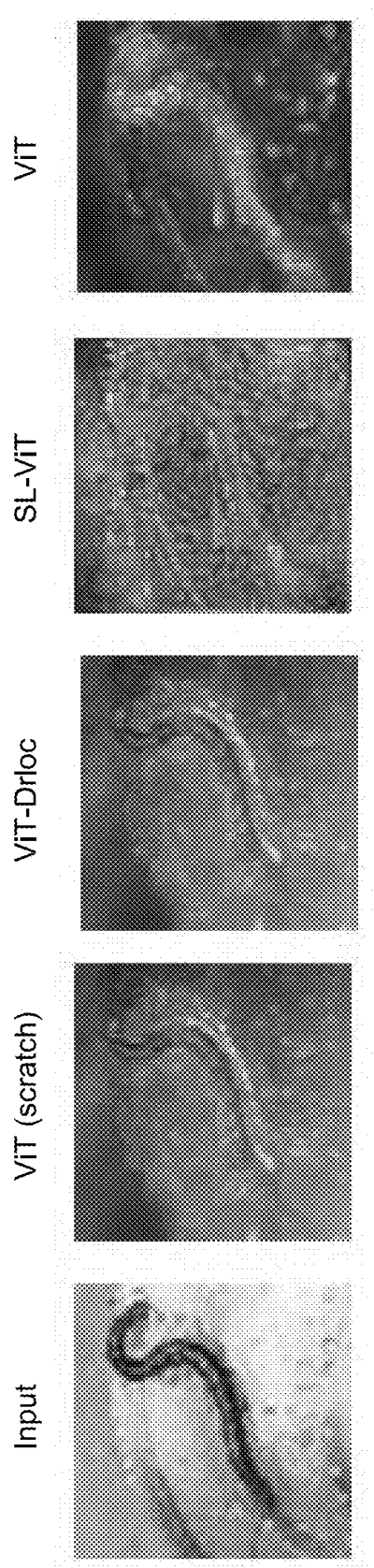
Figure 9E:
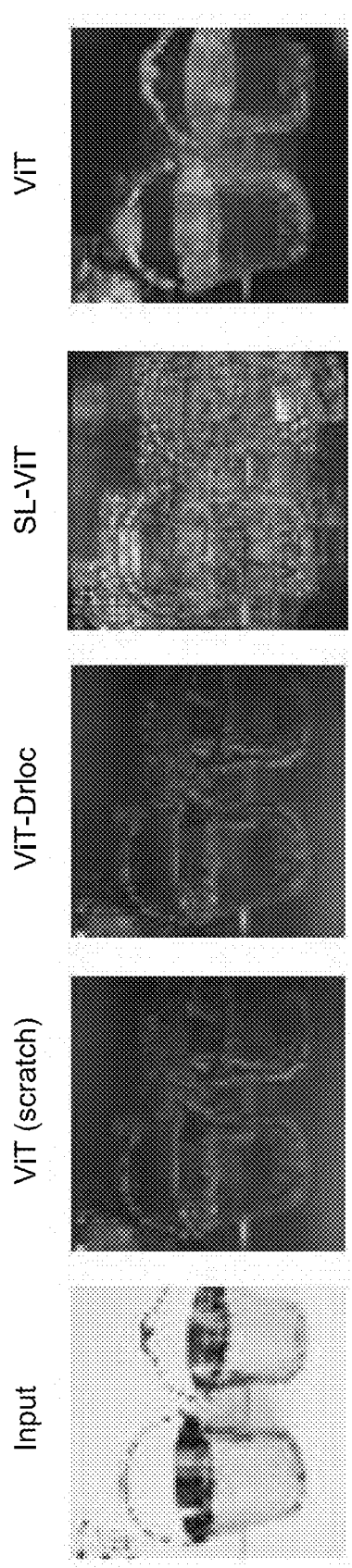
Figure 9F:
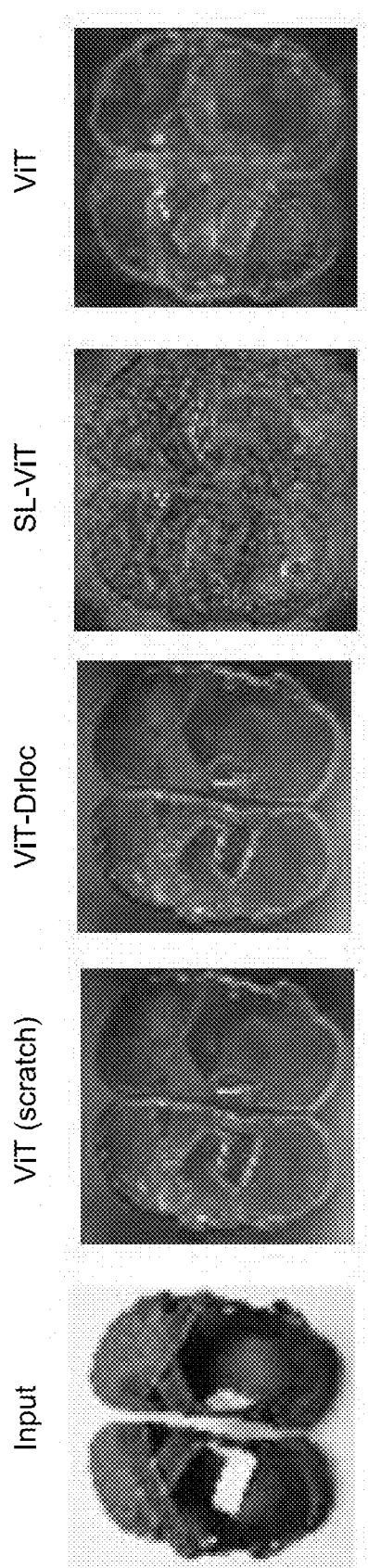
Figure 9G:
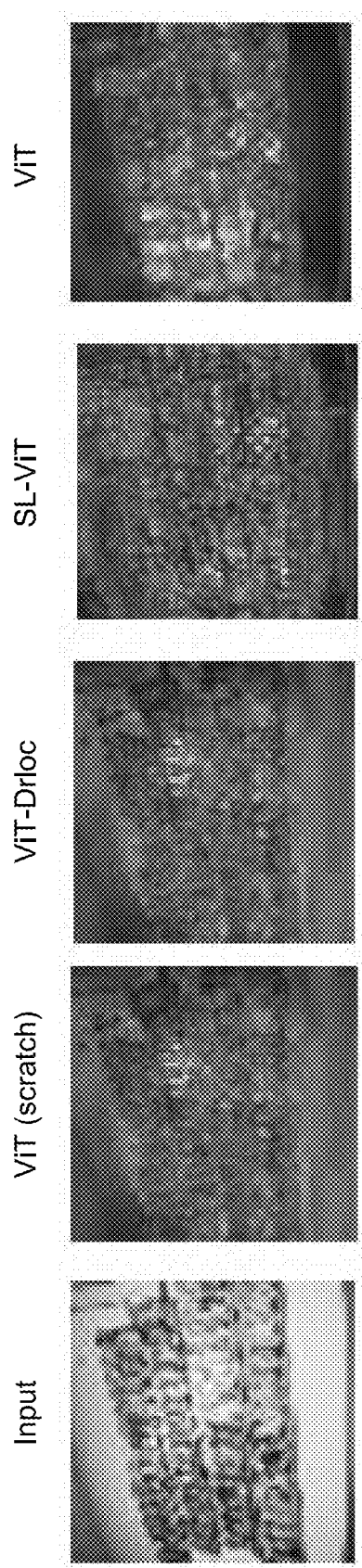
Figure 10A:
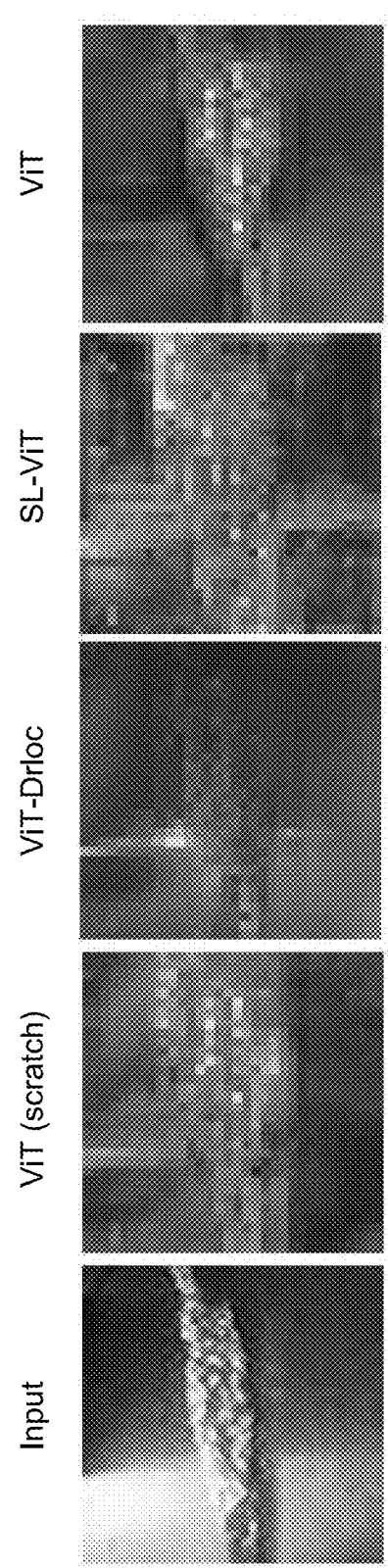
FIGS. 10A-10D illustrate self attention for different vision transformers.
Figure 10B:
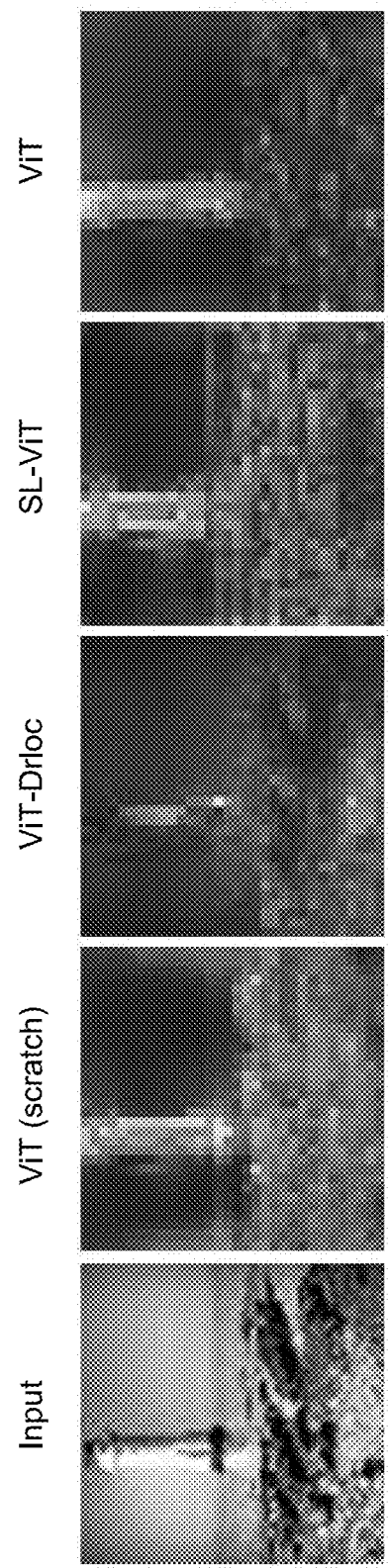
Figure 10C:
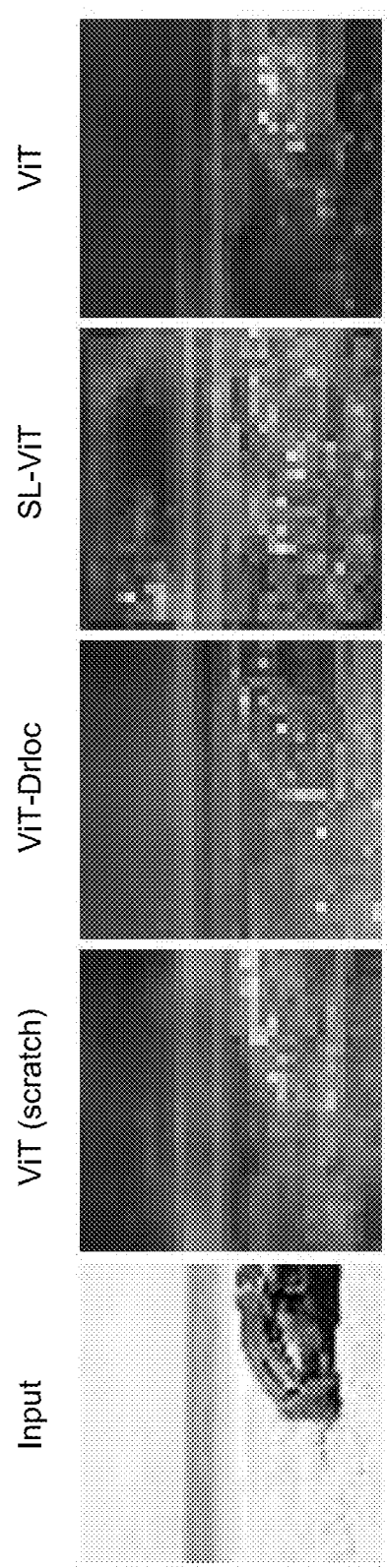
Figure 10D:
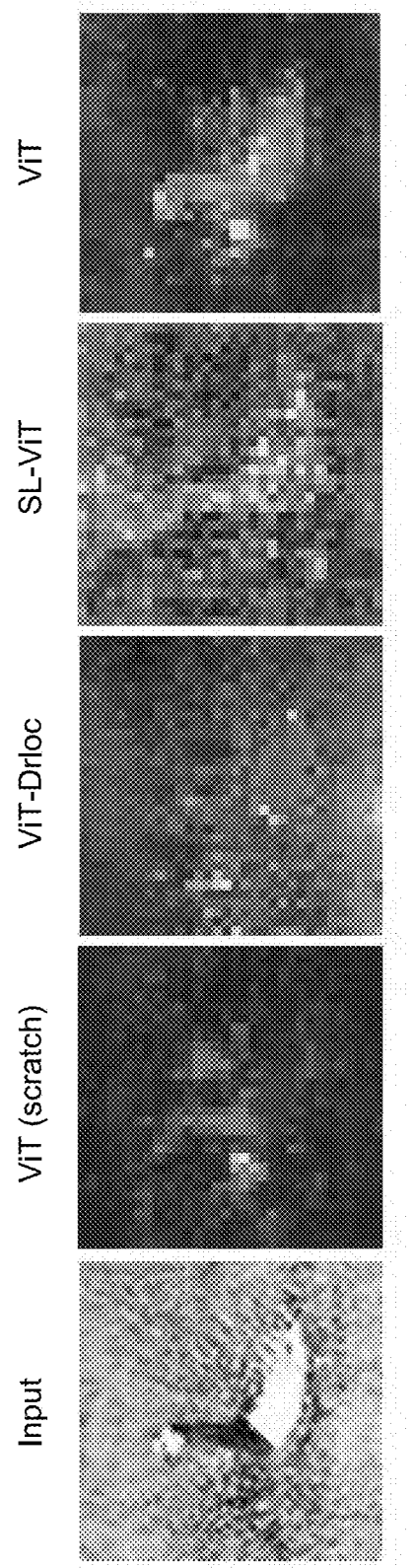

FIGS. 8A, 8B, 8C illustrate CLS tokens from heads of the last block of a vision transformer on low-resolution test samples from Tiny-ImageNet. These CLS tokens (attention maps) demonstrate the effectiveness of the present self-supervised attention stage. The attention maps show the attention of the CLS token from the heads of the last block of ViT for the low-resolution test samples from Tiny-ImageNet. The attention maps show that the present self-supervised pre-training learns to segment the class-specific features from unseen test samples without any supervision.

FIGS. 9A-9G illustrate the attention of the CLS token from the heads of the last block of ViT across different approaches. These CLS tokens demonstrate the effectiveness of the present supervised attention stage. All of the models are fine-tuned for 100 epochs on Tiny-Imagenet. The attention maps show that the present training method is able to capture the salient properties of the specific class in the input and has a sharp focused attention which is missing in conventional ViT baselines.

FIGS. 10A-10D further illustrate self attention for different vision transformers. The images show that the present training method can capture the salient objects in the image in comparison to conventional ViT baselines for which the attention is dispersed in the background.

The images in FIGS. 8A-8C, 9A-9C, 10A-10D represent the attention scores of the class token computed across the attention heads for the last ViT block as projected onto the unseen test samples of Tiny-ImageNet. Based on these results, the present training method is able to capture the shape of salient objects more efficiently with minimal or no attention to the background as compared to the conventional ViT baselines where the attention is more spread out in the background. Conventional ViT baselines completely fail to capture the shape of the salient object in the image.

Ablative Analysis

Figure 11A:
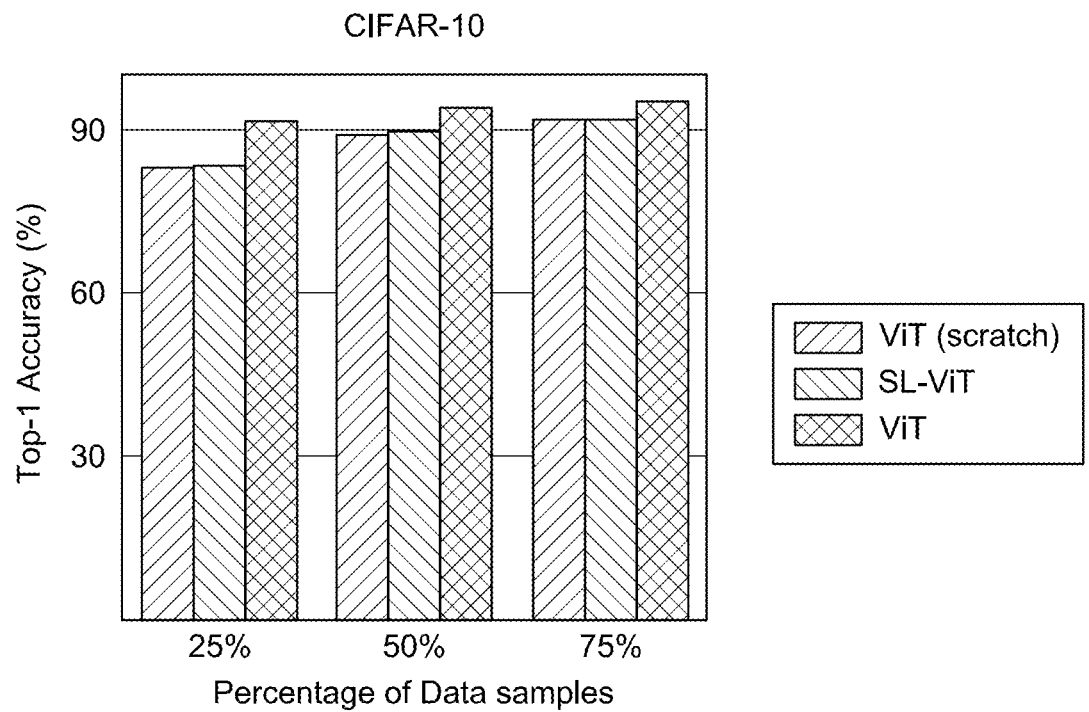
FIGS. 11A, 11B, 11C illustrate the effect of data size on self-supervised learning for weight initialization.
Figure 11B:
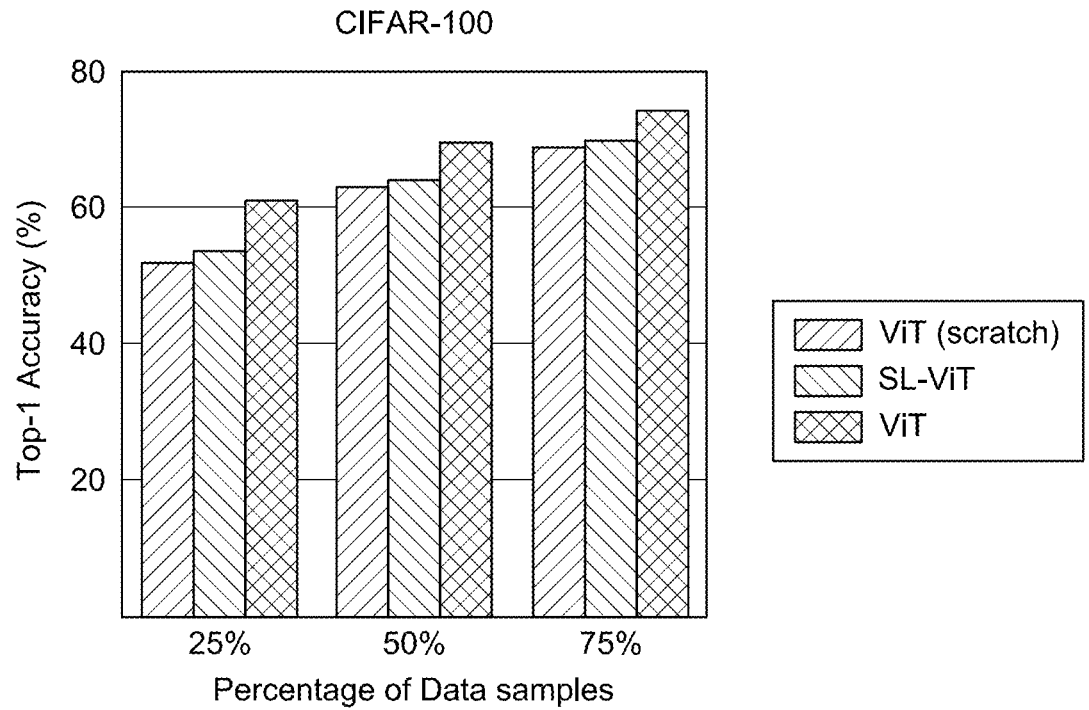
Figure 11C:
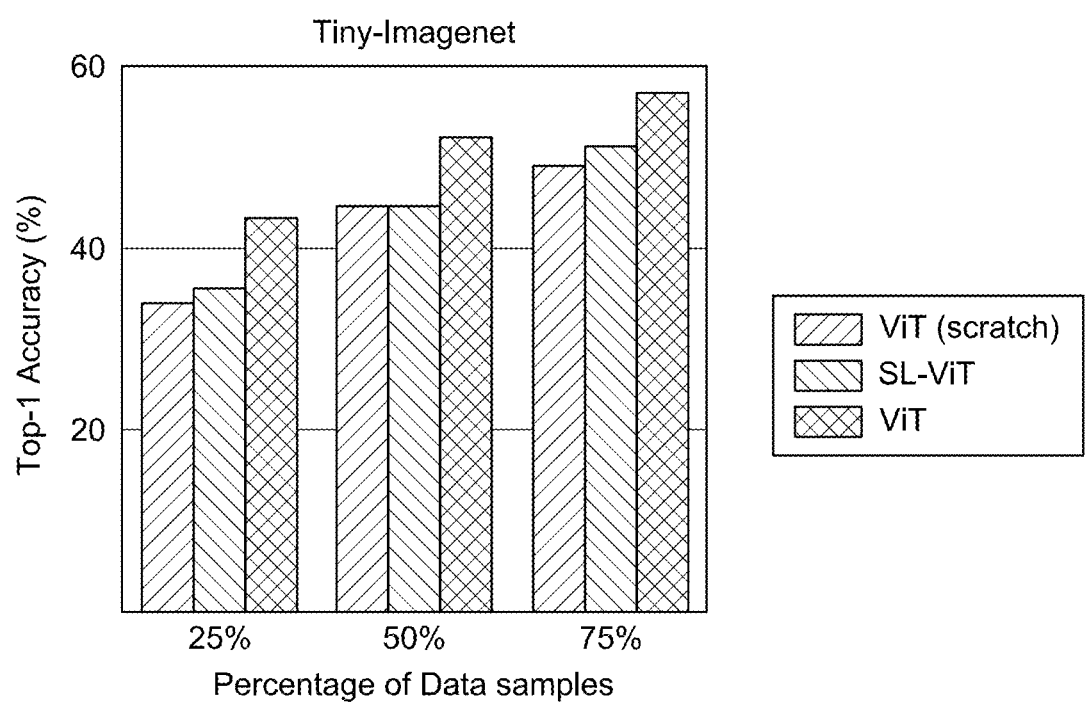

FIGS. 11A, 11B, 11C illustrate the effect of data size on self-supervised learning for weight initialization. The ViT models are trained on 25%, 50% and 75% of the total number of training samples across 3 datasets: CIFAR10, CIFAR100 and Tiny-Imagenet datasets. See Touvron et al. (*International Conference on Machine Learning* (2021)). In case of CIFAR10, the present training method achieves more than 90% top-1 accuracy with just 25% of data and outperforms other approaches with notable margins. A similar trend is observed with CIFAR100 and Tiny-Imagenet datasets.

Effect of Local-Global Crop Ratio: Local and global views are generated by randomly cropping certain regions from the original input image. The cropped area of each generated view is chosen from a specified range of values with respect to the original input size. The impact of the range of aspect ratios are analyzed for local and global views with respect to the original input size in Table 9. The original input size of Tiny-Imagenet is 2× times greater than the other datasets used in the experiments, therefore, a modified range of local-global aspect ratios are used as shown in Table 9 (right). That range of aspect ratios is between (0.2, 0.4) for local view and (0.5, 0.1) for global view works well for the Tiny-ImageNet. Similarly, for the other relatively lower-resolution datasets, the optimal aspect ratios are in the range of (0.2, 0.5) and (0.7, 1.0) for the local and global views, respectively (Table 9).

TABLE 8

Self-supervised teacher weights.

| Model | Weights | CIFAR100 | Tiny-Imagenet |
|---|---|---|---|
| ViT | Student | 77.27 | 61.02 |
| ViT | Teacher | 79.15 | 63.36 |

TABLE 9

The impact of local-global crop ratios chosen during self-supervised training on the Top-1 train accuracy scores of CIFAR10 and CIFAR100 (left), and Tiny-Imagenet (right).

| Local View | Global View | CIFAR10 | | CIFAR100 | | Local View | Global View | Tiny-ImageNet | |
|---|---|---|---|---|---|---|---|---|---|
| | | ViT | Swin | ViT | Swin | | | ViT | Swin |
| (0.1, 0.4) | (0.4, 1.0) | 77.36 | 67.82 | 79.52 | 74.10 | (0.1, 0.3) | (0.3, 1.0) | 64.37 | 74.33 |
| (0.15, 0.4) | (0.4, 1.0) | 78.90 | 68.12 | 78.14 | 74.06 | (0.15, 0.45) | (0.45, 1.0) | 62.02 | 74.09 |
| (0.2, 0.5) | (0.5, 1.0) | 77.48 | 67.90 | 79.53 | 74.05 | (0.2, 0.4) | (0.5, 1.0) | 64.82 | 75.13 |
| (0.2, 0.5) | (0.6, 1.0) | 78.87 | 65.52 | 79.51 | 74.09 | (0.2, 0.4) | (0.6, 1.0) | 62.03 | 57.33 |
| (0.2, 0.5) | (0.7, 1.0) | 79.19 | 71.64 | 79.78 | 74.67 | (0.3, 0.5) | (0.5, 1.0) | 61.69 | 73.92 |

Effect of Self-supervised MLP Dimensions: Table 10 shows the effect of the output head dimension of the present self-supervised projection MLP on the model generalization during supervised fine-tuning stage. The local-global aspect ratio is fixed to their optimal values and ablate over a range of MLP head dimensions. Based on the top-1 accuracy results on train set (Table 10), the dimension of size 1024 is chosen for all the experiments. A MLP head dimension of 1024 gives better overall results on train set across 3 datasets using ViT and Swin architectures.

TABLE 10

Effect of Self-supervised MLP Projection Head:

| SSL Head | CIFAR10 | | CIFAR100 | | Tiny-Imagenet | |
|---|---|---|---|---|---|---|
| | ViT | Swin | ViT | Swin | ViT | Swin |
| 512 | 78.77 | 79.46 | 71.63 | 74.04 | 66.84 | 74.10 |
| 1024 | 79.19 | 79.78 | 71.64 | 74.67 | 65.82 | 75.13 |
| 2048 | 78.83 | 79.48 | 71.15 | 73.87 | 65.05 | 73.95 |
| 4096 | 78.92 | 79.50 | 71.03 | 74.21 | 66.48 | 74.03 |

Effect of Teacher Vs. Student Weights Transfer: The performance of the ViT initialized is compared with the present self-supervised weights from student and teacher networks. In Table 8, it is observed that higher generalization (top-1 accuracy) with the teacher weights corroborates the present strategy of choosing teacher rather than student weights for the supervised training stage. Self-supervised teacher weights transfer well as compared to the student.

Performance comparison with self-supervised learning based CNN: A comparison is provided of ViT with Res-Net18 (2.8 vs. 11.6 million parameters) in Table 11. ViT's performance improves significantly in comparison to self-supervised CNN. In addition, the present self-supervised approach is compared with different contrastive self-supervised methods that are mainly studied for CNNs (Table 12). The present method provides SOTA results for ViTs in comparison to self-supervised CNN.

Efficiency in terms of epochs: The present method is trained for 300 epochs (200 for self-supervised view matching and 100 for supervised label prediction) outperforms the current SOTA approach trained for even 600 epochs (Table 13). The present approach is efficient in terms of epochs used and outperforms the current approach in terms of Top-1 accuracy.

Self-supervised MLP layers: The present self-supervised projection MLP is modified which reduces complexity and increases generalization as shown in Table 14.

Analysis of MLP Head: The larger the size of MLP such as 65536, the lower is the performance on small-scale datasets (Table 10 and Table 15). This is because the large size of MLP head might result in overfitting the features of low resolution views. In Table 10, it is observed that MLP head dimension of 1024 gives better overall results on train set across 3 datasets using ViT and Swin architectures.

TABLE 11

Top-1 accuracy comparison of self-supervised (SS) trained CNN with Present approach.

| Model | Initialization | CIFAR100 | Tiny-Imagenet |
|---|---|---|---|
| ResNet-18 | SS | 65.00 | 53.48 |
| ViT | SS | 79.15 | 63.36 |

TABLE 12

Comparison of other existing self-supervised learning techniques with present using basic ViT architecture.

| Method | Tiny-Imagenet | CIFAR10 | CIFAR100 |
|---|---|---|---|
| SimCLR | 58.87 | 93.50 | 74.77 |
| MOCO-V3 | 52.39 | 93.95 | 72.22 |
| Present | 63.36 | 96.41 | 79.15 |

TABLE 13

The present training method is efficient in terms of epochs used and outperforms the current approach in terms of Top-1 accuracy.

| Method | Epochs | CIFAR100 |
|---|---|---|
| ViT-Drioc | 600 (supervised) | 68.29 |
| ViT (Present) | 200 (self-supervised) + 100 (supervised) | 76.08 |

TABLE 14

Top-1 accuracy comparison of 3-Layer MLP with 1-Layer MLP training.

| Self-supervised MLP layers | CIFAR100 | Tiny-Imagenet |
|---|---|---|
| 1-Layer | 76.69 | 60.54 |
| 3-Layer (Present) | 79.15 | 63.36 |

TABLE 15

Top-1 accuracy comparison of the size of projection head used during self-supervised training.

| Head size | CIFAR100 | Tiny-Imagenet |
|---|---|---|
| 65536 | 77.42 | 60.77 |
| 1024 (Present) | 79.15 | 63.36 |

Figure 12A:
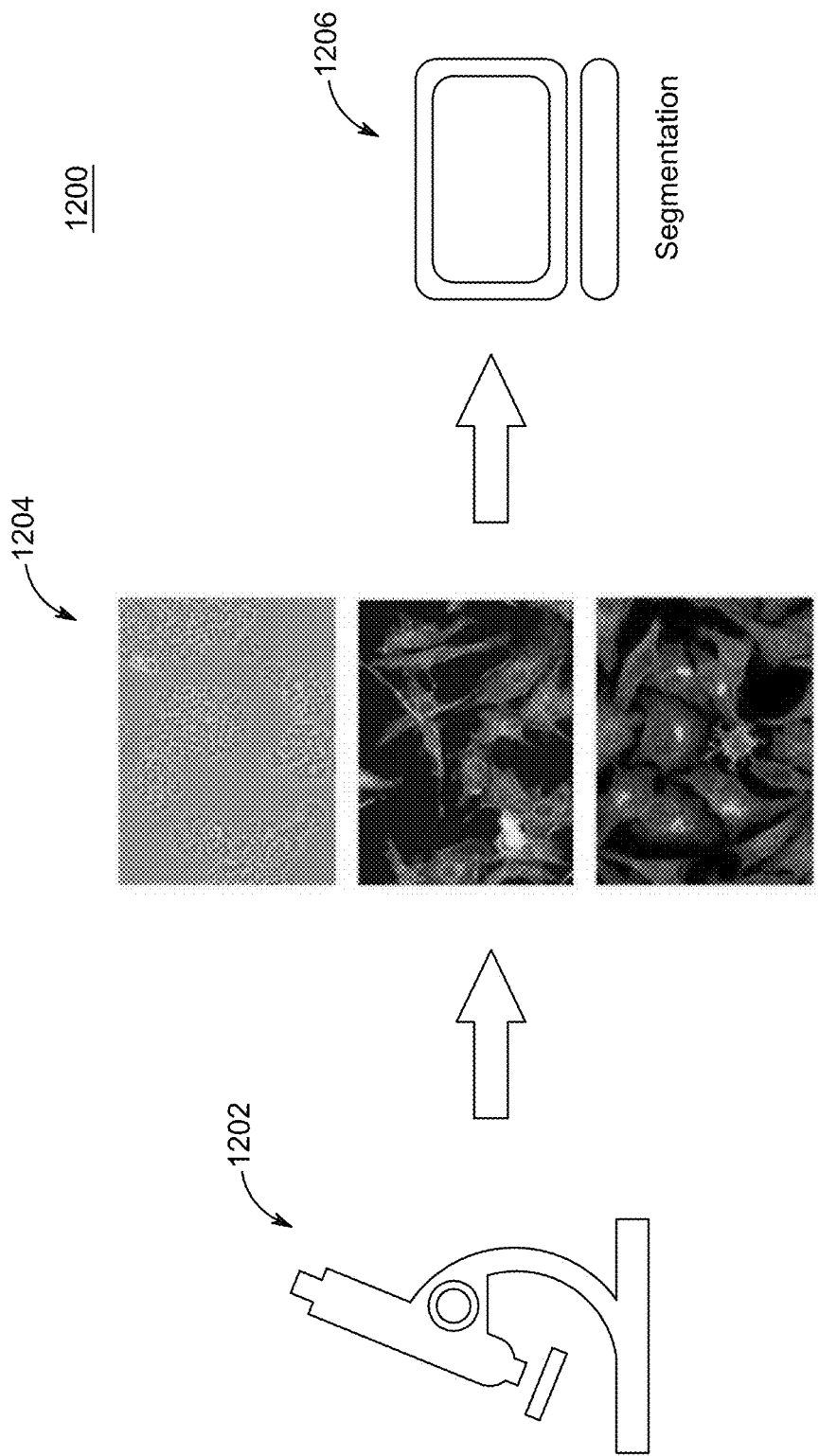
FIGS. 12A, 12B is a flow diagram of segmentation of microscopic cell images.

FIG. 12A is a flow diagram of segmentation of microscopic cell images. Cell segmentation is usually the first step for downstream single-cell analysis in microscopy image-based biology and biomedical research. Deep learning has been widely used for image segmentation, but it is hard to collect a large number of labeled cell images to train models because manually annotating cells is extremely time-consuming and costly. Furthermore, datasets used are often limited to one modality and lacking in diversity, leading to poor generalization of trained models. The present self-supervised to supervised learning approach provides a solution that may be used for cell segmentation that can be applied to various microscopy images across multiple imaging platforms and tissue types.

Figure 12B:
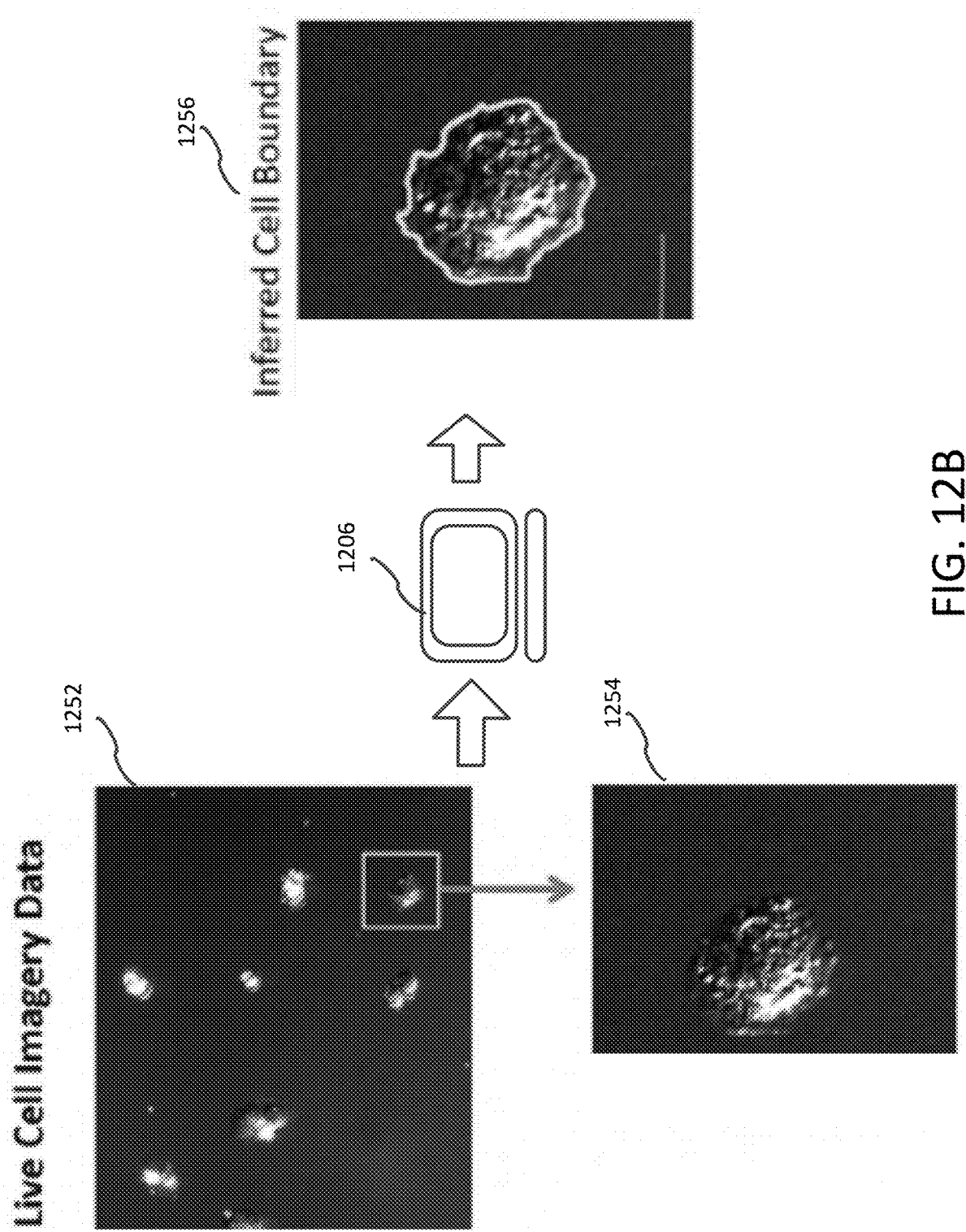

The present training method is applied to cell image segmentation, for example as seen in FIG. 12B. A microscopic image may initially contain multiple cells 1252. An individual cell image 1254 may be extracted from the initial image. The present framework is used to produce a segmented image identifying the boundary of the cell object 1256. A sequence of time-lapse images can be segmented in order to track movement of the cell object.

An initial microscopic image can include a whole-slide image (~10,000×10,000). The present learning method can train on a dataset of highly varied images of cells, containing segmented objects. The microscopic images may include microbe species or individual human cells, as well as a colony of cells. Microbe, or microorganism, species include bacterium. Cell type images can include microscope modalities (e.g., confocal microscopy, stereo microscopy, time-lapse imaging, super resolution microscopy), time resolutions and magnifications.

The present learning method can be applied to develop deep learning models for single-cell analysis, including models for cell segmentation (whole-cell and nuclear) in 2D and 3D images as well as cell tracking in 2D time-lapse datasets. These deep learning models are applicable to multiplexed images of tissues to dynamic live-cell imaging movies.

Figure 13:
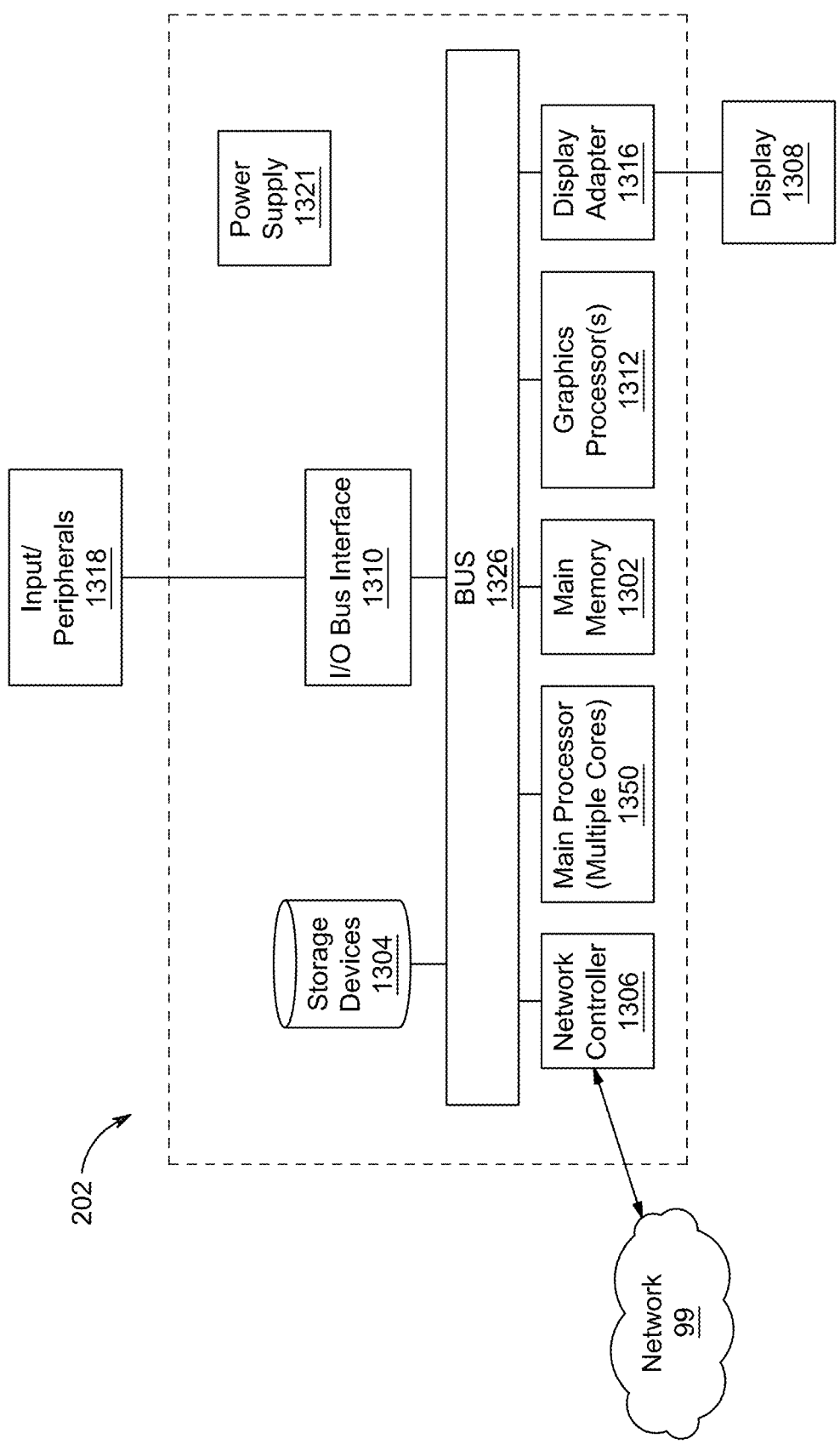
FIG. 13 is a block diagram of a computer system.

FIG. 13 is a block diagram illustrating an example computer system for implementing the machine learning training and inference methods according to an exemplary aspect of the disclosure. The computer system may be an AI workstation configured with an operating system, such as Ubuntu Linux OS, Windows, a version of Unix OS, or Mac OS. The computer system 1300 may include one or more central processing units (CPU) 1350 having multiple cores. The computer system 1300 may include a graphics board 1312 having multiple GPUs, each GPU having GPU memory. The graphics board 1312 may perform many of the mathematical operations of the disclosed machine learning methods. The computer system 1300 includes main memory 1302, typically random access memory RAM, which contains the software being executed by the processing cores 1350 and GPUs 1312, as well as a non-volatile storage device 1304 for storing data and the software programs. Several interfaces for interacting with the computer system 1300 may be provided, including an I/O Bus Interface 1310, Input/Peripherals 1318 such as a keyboard, touch pad, mouse, Display Adapter 1316 and one or more Displays 1308, and a Network Controller 1306 to enable wired or wireless communication through a network 99. The interfaces, memory and processors may communicate over the system bus 1326. The computer system 1300 includes a power supply 1321, which may be a redundant power supply.

In some embodiments, the computer system 1300 may include a server CPU and a graphics card by NVIDIA, in which the GPUs have multiple CUDA cores. In some embodiments, the computer system 1300 may include a machine learning engine 1312.

In summary, an effective strategy is provided for training vision transformers on small-scale low-resolution datasets without large-scale pre-training. The present training method enables learning of self-supervised inductive biases directly from the small-scale datasets. The present network is initialized with the weights learned through self-supervision and then fine-tuned on the same dataset during the supervised training. Extensive experiments demonstrate that the present training method can serve as a better initialization scheme and hence train ViTs from scratch on small datasets while performing favorably well with respect to the conventional state-of-the-art methods. Further, the present training method can be used in a plug-and-play manner for different ViT designs and training frameworks without any modifications to the architectures or loss functions.

Numerous modifications and variations of the present invention are possible in light of the above teachings. It is therefore to be understood that within the scope of the appended claims, the invention may be practiced otherwise than as specifically described herein.

The invention claimed is:

1. A deep learning training system, comprising:
   an imaging system for capturing medical images;
   processing circuitry or a machine learning engine configured to
      select a subset of images from a training dataset of the captured medical images,
      generate global views by randomly selecting regions in one image of the subset of images covering a majority of the image,
      generate local views by randomly selecting regions covering less than a majority of the image of the one image, receive the generated global views as a first sequence of non-overlapping image patches, receive the generated global views and the generated local views as a second sequence of non-overlapping image patches, train parameters in a student-teacher network that includes a student network and a teacher network to predict a class of objects in the global views and the local views by self-supervised view prediction using the first sequence and the second sequence, wherein the processing circuitry updates the teacher parameters via exponential moving average of the student network parameters, wherein the student-teacher network receives a low-resolution input of the one image and the teacher network processes global views of the one image to generate target features while local and global views of the one image are passed through the student network to generate predicted features, initialize parameters in a vision transformer by transferring the trained parameters of the student-teacher network to the vision transformer, and perform supervised learning in the initialized vision transformer using a high-resolution input of the same subset of images; and an output device to output a class label for the one image.

2. The deep learning training system of claim 1, wherein the processing circuitry is configured to initialize the parameters in the vision transformer with trained parameters of the teacher network.

3. The deep learning training system of claim 1, wherein the processing circuitry is configured to train the parameters in the teacher network on the first sequence.

4. The deep learning training system of claim 1, wherein the processing circuitry is configured to train the parameters by self-supervised learning of view prediction, wherein the self-supervised learning is performed using unlabeled data.

5. The deep learning training system of claim 1, wherein the processing circuitry is further configured with a multi-layer projection (MLP) projection head that receives feature representations from each of the student network and the teacher network, and a classification MLP that receives feature representations from the vision transformer.

6. The deep learning training system of claim 1, wherein the student network and the teacher network have the same network structure.

7. The deep learning training system of claim 1, wherein the medical images are microscopic images of cells, and the system further comprises:
a display device,
wherein the processing circuitry is further configured to
select a subset of images from a training dataset of the cell images,
generate global views by randomly selecting regions in one image of the subset of images covering a majority of the image, and
generate local views by randomly selecting regions covering less than a majority of the image of the one image; and
wherein the display device displays an image of a cell showing a segmented region.

8. The deep learning training system of claim 7, wherein the processing circuitry is further configured with a segmentation MLP that receives feature representations from the vision transformer and outputs a segmented image of the cell.

9. The deep learning training system of claim 1, wherein each of the student network, teacher network and vision transformer are configured to be interchanged with a different vision transformer network.

10. The deep learning training system of claim 1, wherein each of the student network, teacher network and vision transformer include a distillation token with the non-overlapping image patches.

11. A non-transitory computer readable storage medium storing program instructions for a deep learning training framework, which when executed by processing circuitry of a machine learning engine, perform a method comprising:
selecting a subset of images from a training dataset of captured medical images;
generating global views by randomly selecting regions in one image of the subset of images covering a majority of the image;
generating local views by randomly selecting regions covering less than a majority of the image of the one image;
receiving the generated global views as a first sequence of non-overlapping image patches;
receiving the generated global views and the generated local views as a second sequence of non-overlapping image patches;
training parameters in a student-teacher network that includes a student network and a teacher network to predict a class of objects in the global views and the local views by self-supervised view prediction using the first sequence and the second sequence, wherein the teacher parameters are updated via exponential moving average of the student network parameters wherein the student-teacher network receives a low-resolution input of the one image and the teacher network processes global views of the one image to generate target features while local and global views of the one image are passed through the student network to generate predicted features;
initializing parameters in a vision transformer by transferring the trained parameters of the student-teacher network to the vision transformer;
performing supervised learning in the initialized vision transformer using a high-resolution input of the same subset of images; and
outputting a class label for the one image.

12. The non-transitory computer readable storage medium of claim 11, further comprising:
initializing the parameters in the vision transformer with trained parameters of the teacher network.

13. The non-transitory computer readable storage medium of claim 11, further comprising training the parameters in the teacher network on the first sequence.

14. The non-transitory computer readable storage medium of claim 11, further comprising training parameters by self-supervised learning of view prediction, where self-supervised learning is performed using unlabeled data.

15. The non-transitory computer readable storage medium of claim 11, further comprising:
a multi-layer projection (MLP) projection head that receives feature representations from each of the student network and the teacher network; and
a classification MLP that receives feature representations from the vision transformer.

16. The non-transitory computer readable storage medium of claim 11, wherein the student network and the teacher network have the same network structure.

17. The non-transitory computer readable storage medium of claim 11, wherein the medical images are microscopic images of cells,
wherein the method further comprises:
selecting a subset of images from a training dataset of the cell images,
generating global views by randomly selecting regions in one image of the subset of images covering a majority of the image;
generating local views by randomly selecting regions covering less than a majority of the image of the one image, and
displaying an image of a cell showing a segmented region.

18. The non-transitory computer readable storage medium of claim 17, further comprising:
a segmentation MLP that receives feature representations from the vision transformer and outputs a segmented image of a cell.

19. The non-transitory computer readable storage medium of claim 11, wherein each of the student network, teacher network and vision transformer are configured to be interchanged with a different vision transformer network.

20. The non-transitory computer readable storage medium of claim 11, wherein each of the student network, teacher network and vision transformer include a distillation token with the non-overlapping image patches.

* * * * *